United States Patent
Adams et al.

(10) Patent No.: US 10,310,110 B2
(45) Date of Patent: Jun. 4, 2019

(54) SYSTEMS AND METHODS FOR SEISMIC DATA ACQUISITION

(71) Applicant: GEOSPACE TECHNOLOGIES CORPORATION, Houston, TX (US)

(72) Inventors: Robbin Barnet Adams, Richmond, TX (US); James Michael Hallaman, Sugar Land, TX (US); Roy James, Cypress, TX (US); Samuel Anil Choudhari, Houston, TX (US); Danny Sheen, Houston, TX (US); Barry S. Basile, Houston, TX (US); Ronny Raborn, Houston, TX (US)

(73) Assignee: Geospace Technologies Corporation, Houston, TX (US)

( * ) Notice: Subject to any disclaimer, the term of this patent is extended or adjusted under 35 U.S.C. 154(b) by 142 days.

(21) Appl. No.: 15/438,225

(22) Filed: Feb. 21, 2017

(65) Prior Publication Data

US 2018/0239040 A1 Aug. 23, 2018

(51) Int. Cl.
*G01V 1/18* (2006.01)
*G01V 1/22* (2006.01)

(52) U.S. Cl.
CPC . *G01V 1/22* (2013.01); *G01V 1/18* (2013.01)

(58) Field of Classification Search
CPC .......... G01V 1/22; G01V 1/003; G01V 1/182; G01V 1/18
USPC .......................................................... 367/40
See application file for complete search history.

(56) References Cited

U.S. PATENT DOCUMENTS

| 5,694,516 A | 12/1997 | Grewe et al. |
| 6,081,163 A | 6/2000 | Ujiie et al. |
| 6,241,028 B1 | 6/2001 | Bijleveld et al. |
| 7,190,634 B2 | 3/2007 | Lambert et al. |
| 7,511,452 B2 | 3/2009 | Bersenev |
| 7,548,600 B2 | 6/2009 | Laine et al. |
| 7,668,657 B2 | 2/2010 | Fenton |

(Continued)

FOREIGN PATENT DOCUMENTS

| CN | 203241544 U | 10/2013 |
| CN | 103576185 A | 2/2014 |

(Continued)

OTHER PUBLICATIONS

Yang, Ding-Xin et al., "Through-Metal-Wall Power Delivery and Data Transmission for Enclosed Sensors: A Review," Sensors, 2015, 15, pp. 31581-31605.

(Continued)

*Primary Examiner* — Daniel L Murphy
(74) *Attorney, Agent, or Firm* — Blank Rome LLP

(57) ABSTRACT

A system for seismic data acquisition includes data recorders that lack external electrical connectors. A seismic data recorder includes a housing. Within the housing the seismic data recorder includes circuitry configured to detect and digitize seismic signals and communication circuitry. The communication circuitry includes a first transmitter plate adjacent a wall of the housing, and a first driver coupled to the first transmitter plate. The communication circuitry configured to communicate the digitized seismic signals to a data retrieval unit that is external to the data acquisition unit via a capacitor formed by the first transmitter plate, the wall of the housing, and a receiver plate external to the housing.

23 Claims, 11 Drawing Sheets

(56) References Cited

U.S. PATENT DOCUMENTS

| | | | |
|---|---|---|---|
| 7,952,322 | B2 | 5/2011 | Partovi et al. |
| 8,296,068 | B2 | 10/2012 | Ray et al. |
| 8,482,250 | B2 | 7/2013 | Soar |
| 8,605,543 | B2 | 12/2013 | Ray et al. |
| 9,255,999 | B2 | 2/2016 | Adams et al. |
| 9,301,258 | B2 | 3/2016 | Preusser et al. |
| 2004/0106376 | A1 | 6/2004 | Forster |
| 2005/0052951 | A1* | 3/2005 | Ray ............... G01V 1/166 367/188 |
| 2007/0286022 | A1 | 12/2007 | Bull et al. |
| 2009/0080290 | A1* | 3/2009 | Ray ............... G01V 1/24 367/51 |
| 2009/0117847 | A1 | 5/2009 | Roesner |
| 2010/0087143 | A1 | 4/2010 | Bonin |
| 2014/0310433 | A1 | 10/2014 | Preusser et al. |
| 2015/0025831 | A1 | 1/2015 | Mourey et al. |
| 2015/0084783 | A1 | 3/2015 | Maxwell |
| 2015/0318015 | A1 | 11/2015 | Bose et al. |
| 2016/0061971 | A1 | 3/2016 | Laine |
| 2016/0134335 | A1 | 5/2016 | Tsai et al. |

FOREIGN PATENT DOCUMENTS

| | | | |
|---|---|---|---|
| EP | 1793307 A1 | 6/2007 | |
| EP | 2677346 A1 | 12/2013 | |
| WO | WO-2014120178 A1 * | 8/2014 | ............... G01V 1/28 |
| WO | 2016202373 A1 | 12/2016 | |

OTHER PUBLICATIONS

Chen, Kejie et al., "Retrieving real-time precise co-seismic displacements with a standalone single-frequency GPS receiver," Advances in Space Research (a COSPAR publication), 2015, 56, pp. 634-647.

Extended European Search Report issued in counterpart European Application No. 18157943.4 dated Oct. 15, 2018.

* cited by examiner

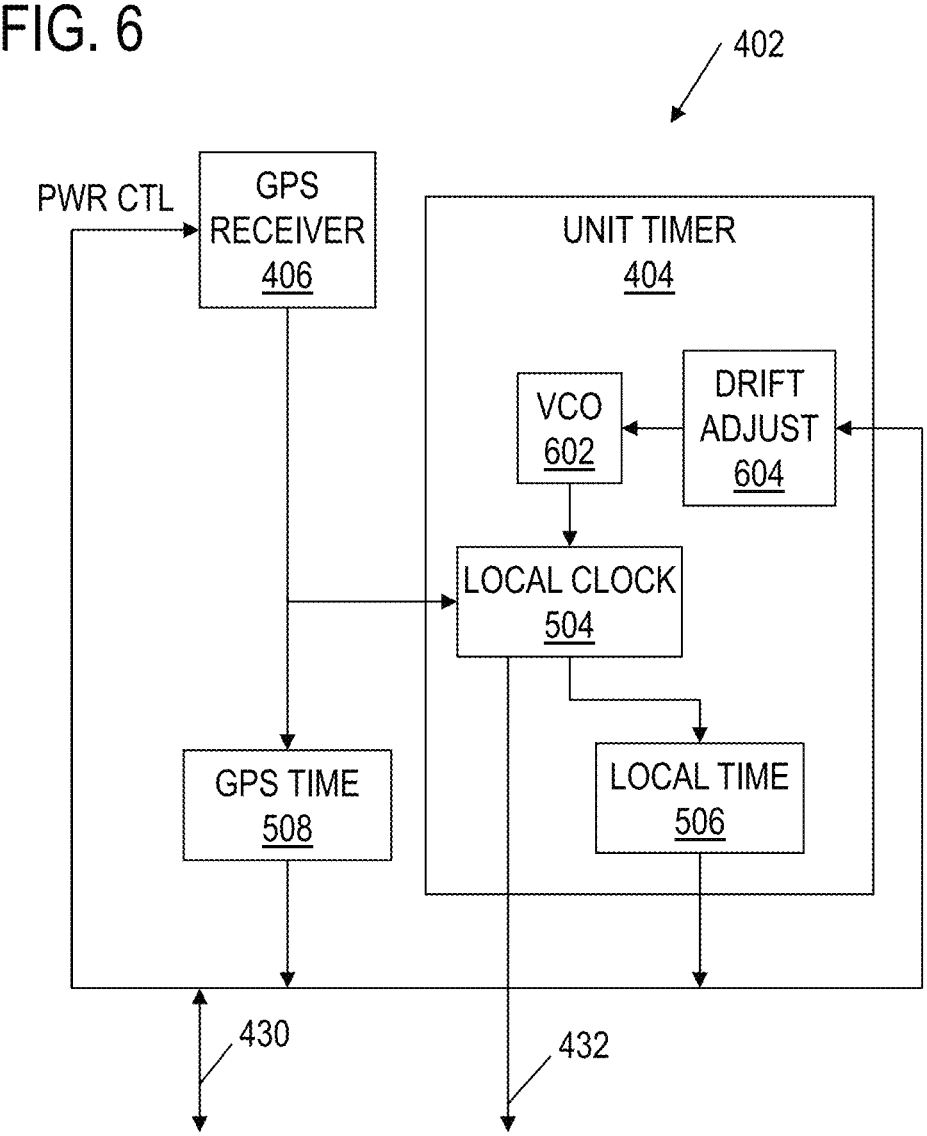

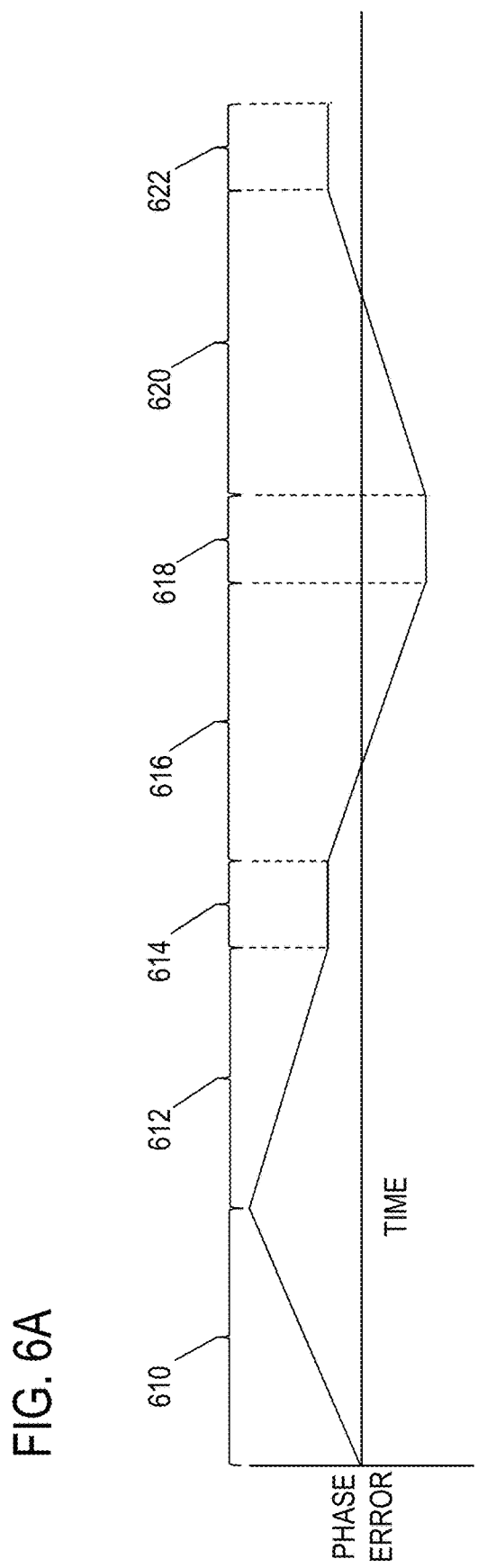

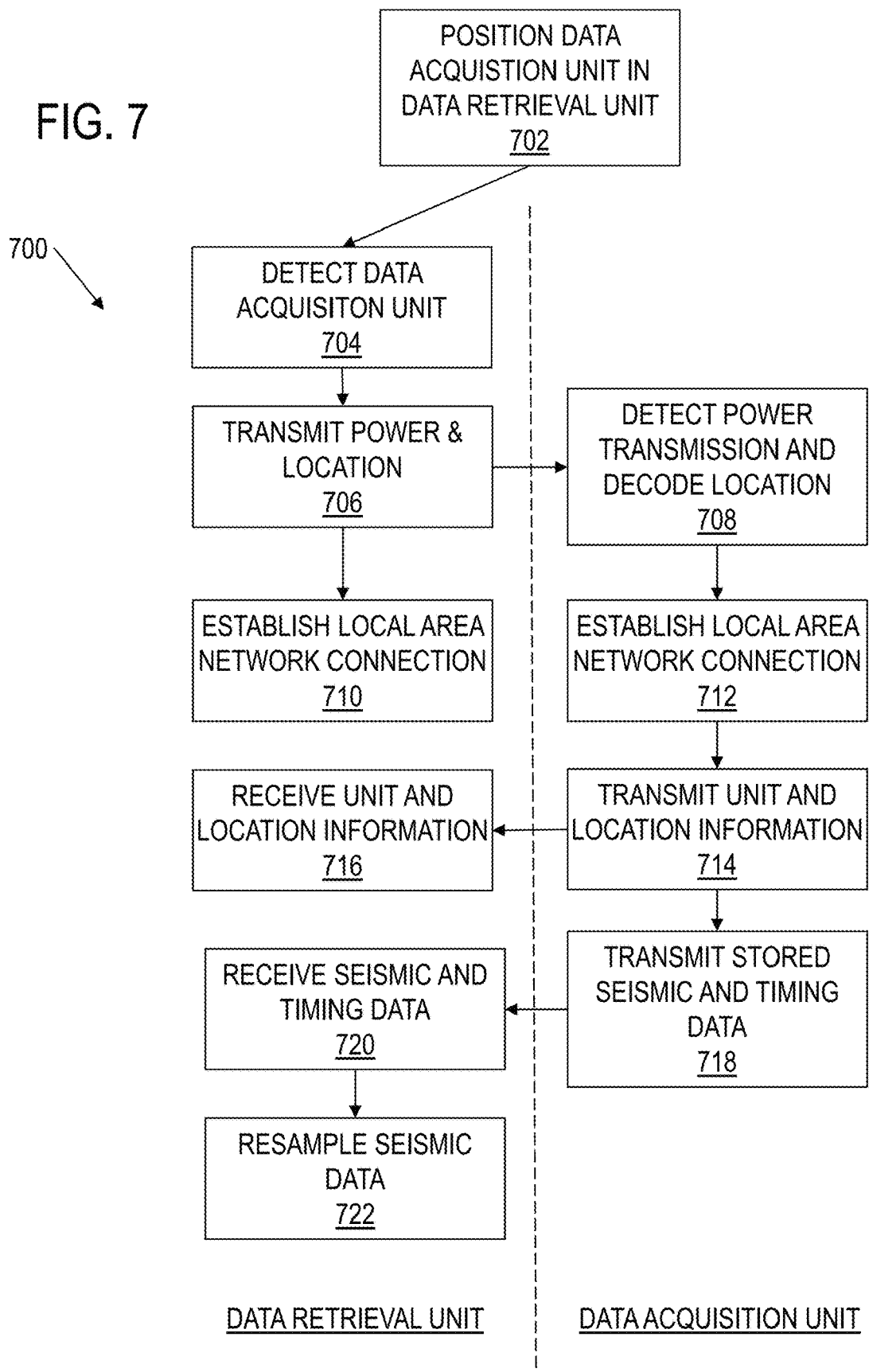

SYSTEMS AND METHODS FOR SEISMIC DATA ACQUISITION

BACKGROUND

Seismic surveys are conducted to map subsurface features. For example, seismic surveys can help locate oil and gas reservoirs. Land based seismic surveys may include hundreds or thousands of individual seismic sensors placed in or on the ground in a grid pattern over an area covering many square kilometers. An explosive charge, seismic vibrator or other suitable source of acoustic energy generates sound waves that propagate through subsurface features. The sound waves are reflected back toward the surface and sensed by the seismic sensors in the grid. Signals from the sensors are collected and used to map the subsurface features in the survey area.

SUMMARY

A system for seismic data acquisition is disclosed herein. The system includes a data acquisition unit and a data retrieval unit that communicate via inductive and capacitive interfaces. The data acquisition unit is sealed and lacks conductive external connectors. The data acquisition unit also includes sample timing circuitry that reduces overall unit power consumption. In one embodiment, a system for seismic data acquisition includes a data acquisition unit. The data acquisition unit includes a housing, and includes disposed within the housing, circuitry configured to detect and digitize seismic signals and communication circuitry configured to communicate the digitized seismic signals to a data retrieval unit external to the data acquisition unit. The communication circuitry includes a first transmitter plate and a first driver coupled to the first transmitter plate. The data retrieval unit includes a first receiver plate, a receiver coupled to the first receiver plate, and an alignment structure. The alignment structure is configured to receive the data acquisition unit and align (place in proper position for operation) the first transmitter plate with the first receiver plate to form a capacitor. The housing serves as a dielectric layer disposed between the first transmitter plate and the first receiver plate.

In another embodiment, a seismic data recorder includes a housing. Within the housing the seismic data recorder includes communication circuitry and circuitry configured to detect and digitize seismic signals. The communication circuitry includes a first transmitter plate adjacent to a wall of the housing, and a first driver coupled to the first transmitter plate. The communication circuitry is configured to communicate the digitized seismic signals to a data retrieval unit that is external to the data acquisition unit via a capacitor formed by the first transmitter plate, the wall of the housing, and a receiver plate external to the housing.

In a further embodiment, a data retrieval unit includes a plurality of slots. Each of the slots is configured to receive a data acquisition device and retrieve digitized seismic signals from the data acquisition device. Each of the slots includes a first receiver plate, a receiver coupled to the first receiver plate, and an alignment structure. The alignment structure is configured to align the first receiver plate and a first transmitter plate of the data acquisition device. Aligning the first receiver plate and the first transmitter plate forms a capacitor in which a housing of the data acquisition device serves as a dielectric layer between the first receiver plate and the first transmitter plate. The receiver is configured to receive the digitized seismic samples via the capacitor.

BRIEF DESCRIPTION OF THE DRAWINGS

For a detailed description of exemplary embodiments, reference will now be made to the accompanying drawings, in which:

FIG. 6 shows a block diagram for a timing unit using a drift adjusted clock in a seismic data acquisition unit in accordance with principles disclosed herein;

FIG. 6A shows operation of a timing unit to produce a drift adjusted clock in a seismic data acquisition unit in accordance with principles disclosed herein;

FIG. 7 shows a flow diagram for method for data retrieval in a seismic data acquisition system that includes connector-less data acquisition units in accordance with principles disclosed herein;

NOTATION AND NOMENCLATURE

Figure 1:
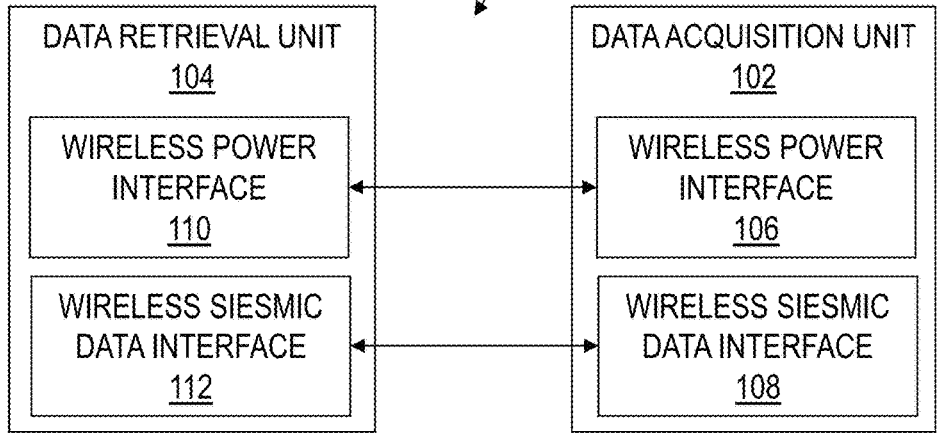
FIG. 1 shows a block diagram of a seismic data acquisition system that includes a connector-less data acquisition unit in accordance with principles disclosed herein.

In the following discussion and in the claims, the terms "including" and "comprising" are used in an open-ended fashion, and thus should be interpreted to mean "including, but not limited to . . . ". The term "couple" is not meant to limit the interaction between elements to direct interaction between the elements and may also include indirect interaction between the elements described. The term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

In the drawings and description of the present disclosure, like parts are typically marked throughout the specification and drawings with the same reference numerals. The drawing figures are not necessarily to scale. Certain features of the invention may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results.

A seismic data acquisition system may include thousands of data acquisition devices to map a selected geographic area. The data acquisition devices are typically operated under harsh environmental conditions and the maintenance of such a large number of devices can be costly due to the substantial number of personnel and significant resources may be needed to keep the devices in working order. Conventional seismic data acquisition devices typically provide for transfer of seismic data and power between the acquisition device and external systems via one or more connectors, such as electrical or optical connectors, provided in the exterior of a housing of the acquisition device. For example, an electrical connector located on an exterior surface of a data acquisition device housing may include conductive contacts for passing electrical signals between the internal circuitry of the acquisition device and an external system. Unfortunately, connectors accessible from the exterior of the recording device are one of the most failure prone components of the data acquisition device. For example, the contacts of an external connector may break or corrode due to harsh field treatment and environmental conditions. External connectors also provide a path for fluid exchange with the interior of the data acquisition device that can result in fluid incursion that causes performance degradation or failure.

Embodiments of the seismic data acquisition unit disclosed herein provide improved reliability relative to conventional seismic data acquisition devices. The seismic data acquisition units of the present disclosure include no connectors on the exterior of or passing through the housing of the data acquisition unit housing for electrically interfacing the device to external systems. Instead of connectors, the data acquisition unit provides wireless interfaces for transfer of power to the data acquisition unit, and transfer of seismic data to/from the data acquisition unit. Embodiments of the connector-less data acquisition unit may be suitable for land or marine use.

In the seismic data acquisition system disclosed herein, seismic data may be stored in the data acquisition units and extracted from seismic data acquisition units at a central location where a large number (e.g., thousands) of seismic data acquisition units are in close proximity (e.g., within a few feet) to one another and coupled to a data retrieval unit. Under such conditions radio-frequency wireless interfaces may interfere with one another to a degree that adversely affects data transfer efficiency and increases the time needed to transfer acquired seismic data from the data acquisition units to the data retrieval unit. The data acquisition units of the present disclosure include wireless interfaces that are not affected by the proximity of other data acquisition devices, and consequently, provide a high data transfer rate under conditions that would significantly hinder radio frequency (RF) data interfaces. Rather than RF or magnetic interfaces, embodiments of the data acquisition unit and the data retrieval unit disclosed herein include capacitive interfaces that provide communication between the data acquisition device and the data retrieval unit. The capacitive interfaces of one data acquisition unit are unaffected by data transfers via the capacitive interfaces of neighboring data acquisition units. Accordingly, embodiments of the seismic data acquisition system are able to download seismic data at a high rate under conditions that would significantly hinder RF communication.

The data acquisition unit and data retrieval unit disclosed herein also include a power transfer interface that provides inductive charging of the battery powering the data acquisition unit. Charging and seismic data upload may by performed simultaneously. The power transfer system of the present disclosure also allows information to be transferred from the data retrieval unit to the data acquisition unit via the power signals transmitted by the data retrieval unit. For example, information specifying the physical location of the data acquisition unit (i.e., the physical location of the data retrieval unit to which the data acquisition unit is coupled) may be encoded in the power signals transmitted by the data retrieval unit. On receipt of the location information, the data acquisition unit may inform the data retrieval unit of the data acquisition unit's physical location via the higher bandwidth capacitive interface.

FIG. 1 shows a block diagram of a seismic data acquisition system 100 that includes a connector-less data acquisition unit 102 in accordance with principles disclosed herein. The seismic data acquisition system 100 includes the data acquisition unit 102 and a data retrieval unit 104. While only a single data acquisition unit 102 is shown in FIG. 1, in practice the data retrieval unit 104 may be capable of simultaneously communicating with any number of data acquisition units 102. Accordingly, any number of data acquisition units 102 may be communicatively coupled to the data retrieval unit 104 in the system 100. The data retrieval unit 104 includes a wireless power interface 110 and a wireless seismic data interface 112. Similarly, the data acquisition unit 102 includes a wireless power interface 106 and a wireless seismic data interface 108. The data retrieval unit 104 transmits power to the data acquisition unit 102 via the wireless power interface 110. The data acquisition unit 102 receives power transmitted by the data retrieval unit 104 via the wireless power interface 106. Power transfer between the wireless power interface 110 and the wireless power interface 106 may be inductive.

In some embodiments, the wireless power interface 110 may include circuitry to encode information in the transmitted power signals. For example, information may be encoded in amplitude, frequency, or phase changes of the transmitted power signals. The wireless power interface 106 may include circuitry to decode the information encoded in the power signals.

The data acquisition unit 102 may transmit seismic data and/or other information stored in the data acquisition unit 102 to the data retrieval unit 104 via the wireless seismic data interface 108. Correspondingly, the data retrieval unit 104 receives transmitted seismic data via the wireless seismic data interface 112. The data transfer rate provided by the wireless seismic data interfaces 108, 112 may be relatively high (e.g., 100 megabits per second or more) to reduce the time required to transfer a large amount (e.g., gigabytes) of seismic data. The communication channel provided the wireless seismic data interfaces 108, 112 may be bidirectional to allow transfer of information from the data retrieval unit 104 to the data acquisition unit 102. For example, the data retrieval unit 104 may transfer commands and/or parameters to the data acquisition unit 102 via the wireless seismic data interfaces 108, 112.

Figure 2:
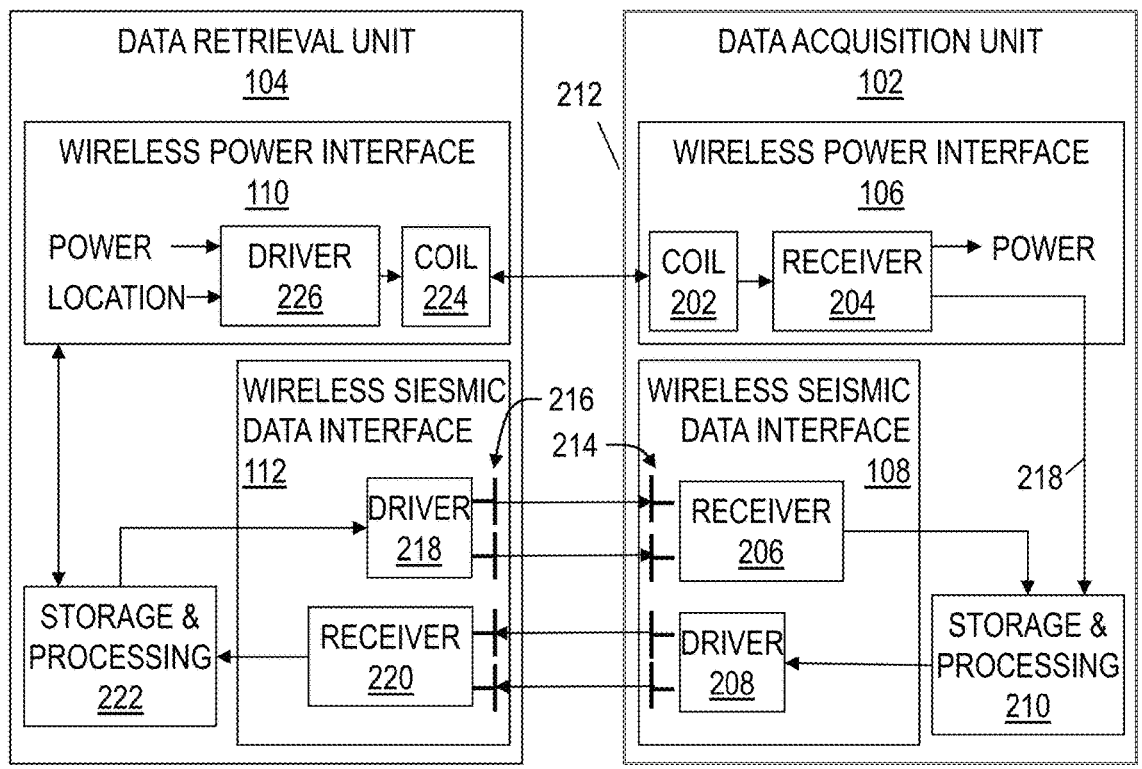
FIG. 2 shows a block diagram of a seismic data acquisition system that includes a connector-less data acquisition unit in accordance with principles disclosed herein.

FIG. 2 shows a more detailed block diagram of the seismic data acquisition system 100. The data acquisition unit 102 includes storage and processing circuitry 210 that is coupled to the wireless power interface 106 and to the wireless seismic data interface 108. The storage and processing circuitry 210 may include control circuitry and memory devices. The memory devices may include volatile and/or non-volatile semiconductor memory devices to store samples of seismic data acquired by the data acquisition unit 102, acquisition timing information, software program instructions, and/or other data. The control circuitry may include seismic data acquisition circuitry and unit control circuitry. For example, the control circuitry may include timing circuitry to provide timing for seismic acquisition, one or more processors (e.g., microcontrollers, general purpose microprocessors, digital signal processors, etc.) and other circuitry to control the operation of the data acquisition unit 102.

Similarly, the data retrieval unit 104 includes storage and processing circuitry 222 that is coupled to the wireless power interface 110 and to the wireless seismic data interface 112. The storage and processing circuitry 222 may include control circuitry and memory devices. The memory devices may include volatile and/or non-volatile semiconductor memory devices to store samples of seismic data and acquisition timing information received from the data acquisition unit 102, software program instructions, and/or other data. The control circuitry may include logic for controlling download of seismic data from the data acquisition unit 102. Such logic may be embodied in one or more processors and associated programming and/or other circuitry to control the operation of the data retrieval unit 104. In some embodiments, the storage and processing 222 may be embodied in a computer as known in the art. For example, a desktop computer, a laptop computer, a rackmount computer, etc. may operate as the processing and storage 222 of the data retrieval unit 104, where the computer is connected to the wireless seismic data interface 112 via a wired network, a wireless network, and/or any other communicative connection. Some embodiments of the storage and processing 222 may include multiple computers such that a first computer provides a first portion of the functionality described herein with respect to the storage and processing 222 and a second computer provides a second portion of the functionality described herein with respect to the storage and processing 222. The first and second computers may be deployed at a same location or at different locations that are separated by any distance.

The wireless power interface 110 of the data retrieval unit 104 includes a coil 224 and a driver 226. The driver 226 energies the coil 224 to produce a magnetic field at the frequency of the signal driving the coil 224. The driver 226 may also include circuitry to encode information in the signal produced by the driver 226 to drive the coil 224. For example, the driver 226 may include circuitry to encode location information in the signal driving the coil 224 for transmission to the data acquisition unit 102 via the magnetic field generated by the coil 224. The location information may include information that specifies a physical location of the data retrieval unit wireless power interface 110, and by extension a physical location of the data acquisition unit 102 receiving the magnetic signals generated by the wireless power interface 110 of the data retrieval unit 104. The driver 226 may encode the location information in the signal driving the coil 224 in a variety of ways. For example, the driver 226 may encode the location information as changes in phase, frequency, or amplitude of the signal driving the coil 224.

The wireless power receiver 106 of the data acquisition unit 102 includes a coil 202 and a receiver 204. The magnetic field generated by the coil 224 of the data retrieval unit 104 induces current flow in the coil 202. The frequency of the current flowing in the coil 202 corresponds to the oscillation frequency of the magnetic field. Current flowing in the coil 202 is conducted to the receiver 204. The receiver 204 includes rectification circuitry (e.g., synchronous rectification circuitry) to convert the alternating current induced in the coil 202 to a direct current. The receiver 204 may include switching and/or linear regulators to generate a variety of voltages for charging and/or powering the data acquisition 102. The receiver 204 may also include decoding circuitry to extract the location information encoded in the power signal by the data retrieval unit 104. The decoding circuitry may include circuitry configured to identify binary states based on amplitude, frequency, or phase of the current flowing in the coil 202 or the voltage across the coil 202, voltage across a capacitor or other component coupled to the coil 202, etc. The receiver 204 may provide the received location information 218 to processing and storage circuitry 210 for storage and/or processing.

In the system 100, the wireless seismic data interface 112 of the data retrieval unit 104, and the wireless seismic data interface 108 of the data acquisition unit 102 provide a capacitive connection for exchange of seismic and other data. The wireless seismic data interface 112 of the data retrieval unit 104 includes plates 216, driver 218, and receiver 220. Similarly, the wireless seismic data interface 108 of the data acquisition unit 102 includes plates 214, driver 208, and receiver 206. While the wireless seismic data interfaces 108, 112 have been illustrated as respectively including four plates 214, 216, some embodiments of the wireless seismic data interfaces 108, 112 may include a different number of plates 214, 216 (e.g., one, two, or three plates 214, 216). The plates 214, 216 may be formed of a metal, such as aluminum, copper, or other material suitable for use as the plate of a capacitor.

The data acquisition unit 102 also includes a housing 212. The data acquisition unit 102 is communicatively coupled to the data retrieval unit 104 by aligning the coil 202 with the coil 224, and aligning each of the plates 214 with a corresponding plate 216. Aligning the coils 202 and 224 forms an inductive communication link for transfer of power and location information from the data retrieval unit 104 to the data acquisition unit 102. Aligning each of the plates 214 with one of the plates 216 forms one or more capacitive communication links between the data retrieval unit 104 and the data acquisition unit 102. The housing 212 of the data acquisition unit 102 serves as a dielectric separating the plates 214 from the plates 216. Each pair of the aligned plates 214 and 216 and the intervening housing 212 forms a capacitor through which the data acquisition unit 102 and the data retrieval unit 104 communicate through the housing 212. The housing 212 may be formed of a polymer material, such as polypropylene, or other material suitable for use as the dielectric layer of a capacitor.

In the system 100, two of the plates 214 are coupled to the driver 208, and two of the plates 216 are coupled to the receiver 220. The driver 208 may generate a differential output signal, and drive a first of the plates 214 with one side (+) of the differential output signal and drive a second of the plates 214 with the other side (−) of the differential output signal. The differential output signal generated by the driver 208 may include seismic data samples and/or other data to be transferred from the data acquisition unit 102 to the data retrieval unit 104. Some embodiments of the driver 208 may include circuitry and logic to provide transmission in accordance with an IEEE 802.3 interface standard. Data transmitted by the driver 208 may be provided by the storage and processing circuitry 210.

The receiver 220 detects signals passed from the data acquisition unit 102 to the data retrieval unit 104 via the plates 214, 216 coupled to the driver 208 and the receiver 220 respectively. The receiver 220 may be a differential receiver that converts the differential signal received via the plates 216 to a single-ended signal or to a further differential signal. Some embodiments of the receiver 220 may include circuitry and logic to receive signals in accordance with an IEEE 802.3 interface standard. The receiver 220 is coupled to the storage and processing circuitry 222. Accordingly, the receiver 220 may provide the data received from the data acquisition unit 102 to the storage and processing unit 222 for storage and processing.

Information is transferred from the data retrieval unit 104 to the data acquisition unit 102 via the driver 218 of the data retrieval unit 104 and the receiver 206 of the data acquisition unit 102. Two of the plates 214 are coupled to the receiver 206, and two of the plates 216 are coupled to the driver 218. The driver 218 may generate a differential output signal, and drive a first of the plates 216 with one side (+) of the differential output signal and drive a second of the plates 216 with the other side (−) of the differential output signal. The differential output signal generated by the driver 218 may include commands, parameters, or data to be transferred from the data retrieval unit 104 to the data acquisition unit 102. Some embodiments of the driver 218 may include circuitry and logic to provide transmission in accordance with an IEEE 802.3 interface standard. Data transmitted by the driver 218 may be provided by the storage and processing circuitry 222.

The receiver 206 detects signals passed from the data retrieval unit 104 to the data acquisition unit 102 via the plates 214, 216 coupled to the driver 218 and the receiver 206. The receiver 206 may be a differential receiver that converts the differential signal received via the plates 214 to a single-ended signal or to a further differential signal. Some embodiments of the receiver 206 may include circuitry and logic to receive signals in accordance with an IEEE 802.3 interface standard. The receiver 206 is coupled to the storage and processing circuitry 210. Accordingly, the receiver 206 may provide the data received from the data retrieval unit 104 to the storage and processing unit 210 for storage and manipulation.

The capacitive interfaces formed by the plates 214, 216 and the housing 212 allow the data acquisition unit 102 to transfer seismic data to the data retrieval unit 104 at a relatively high rate. Any number of data acquisition units 102 may be coupled to the data retrieval unit 104 via corresponding capacitive interfaces for wireless transfer of seismic data, and each of the capacitive interfaces is free from interference due to neighboring capacitive interfaces.

Figure 3A:
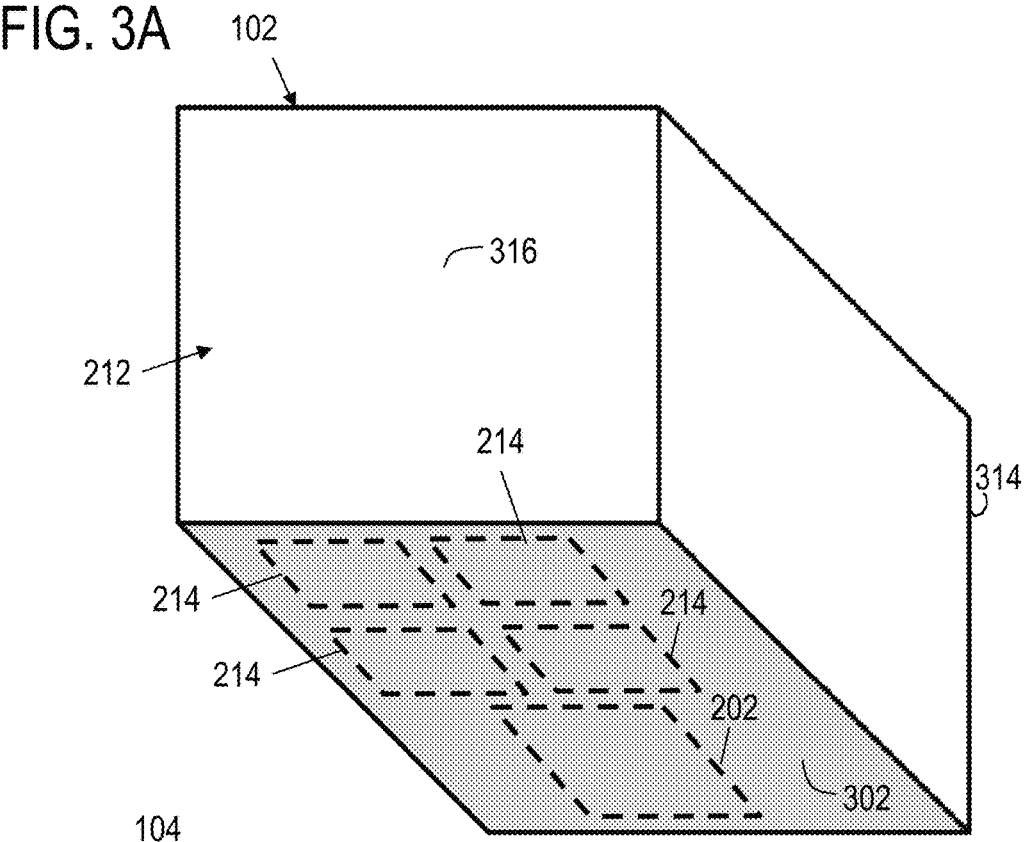
FIGS. 3A and 3B respectively show a connector-less seismic data acquisition unit and a slot of a data retrieval unit to receive the data acquisition unit in accordance with principles disclosed herein.
Figure 3B:
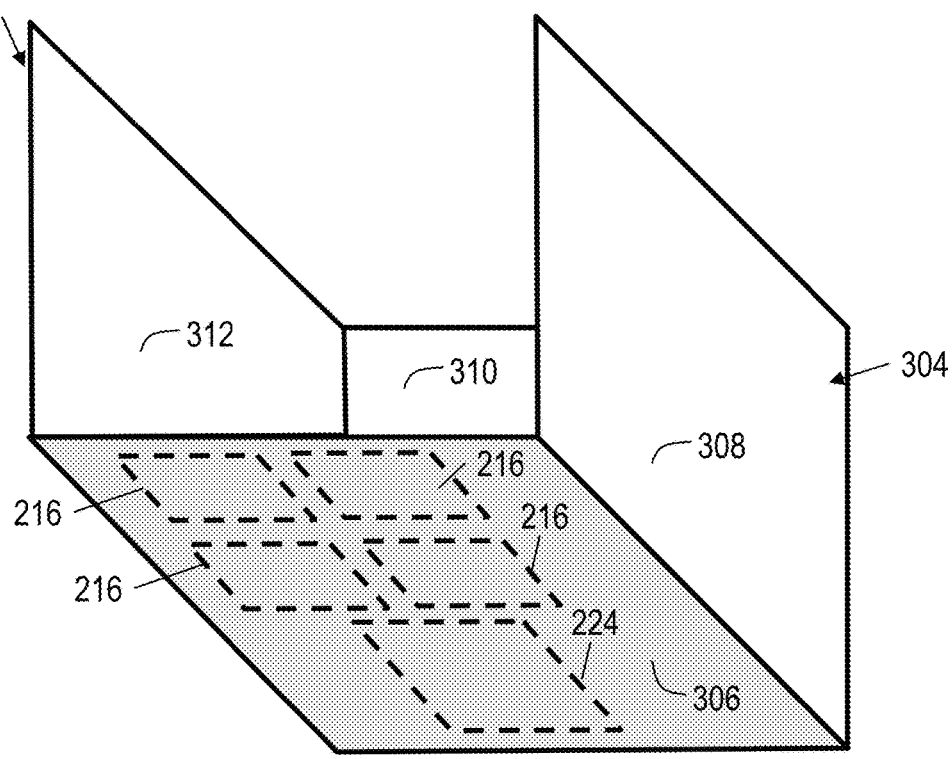

FIGS. 3A and 3B respectively show a connector-less seismic data acquisition unit 102 and a slot 304 of a data retrieval unit 104 arranged to receive the data acquisition unit 102 in accordance with principles disclosed herein. The data retrieval unit 104 may include any number of slots 304. For example, the data retrieval unit 104 may be provided as a rack that includes a number of slots 304 to receive a corresponding number of data acquisition units 102. Each slot 304 may include a wireless power interface 110 and a wireless seismic data interface 112.

As shown in FIG. 2, the data acquisition unit 102 includes plates 214 and coil 202 within housing 212. For example, the plates 214 may be adjacent to and in contact with or near an interior surface of the housing 212. Similarly, the coil 202 may in contact with or near the inner surface of the housing 212. In FIG. 3A, all of the plates 214 and the coil 202 are arranged on a single side 302 of the data acquisition unit 102. In some embodiments, one or more of the plates 214 and the coil 202 may be disposed on different sides of the data acquisition unit 102. The plates 214, 216 may be formed of a metal, such as aluminum or copper, and each plate 214, 216 may be, for example, one square inch or more in area. In FIG. 3A, the housing 212 is shaped as a rectangular cuboid. In some embodiments of the data acquisition unit 102, the housing 212 may be differently shaped. For example, the housing 212 may be shaped as a cube, a cylinder, a hexagonal prism, an octagonal prism, etc.

FIG. 3B represents a slot 304 of the data retrieval unit 104 arranged to receive the data acquisition unit 102. The slot 304 includes plates 216 and coil 224 arranged to align with the plates 214 and coil 202 of the data acquisition unit 102 when the data acquisition unit 102 is properly positioned in the slot 304. The slot includes sides 306, 308, 310, and 312 that serve as alignment structures to align the data acquisition unit in the slot 304. For example, if the back side 314 (opposite the front side 316) of the data acquisition unit 102 is in contact with side 310 of the slot 304, then the data acquisition unit 102 may be positioned in the slot 304 to provide alignment of the coils 202, 224, and the plates 214, 216. Some embodiments of the slot 304 may provide different and/or additional alignment structures. In some embodiments of the slot 304, one or more of the plates 216 and the coil 224 may be disposed on different sides of the slot 304 to correspond to the arrangement of the plates 214 and coil 202 of the data acquisition unit 102. Embodiments of the data retrieval unit 104 may include multiple slots 304 to provide simultaneous download of seismic data from multiple data acquisition units 102.

Figure 3C:
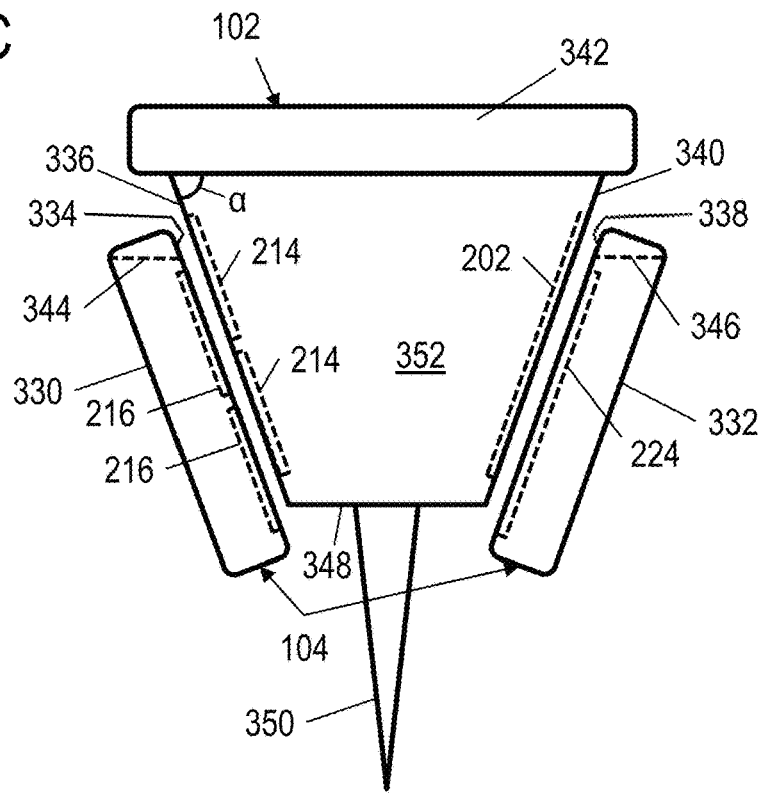
FIGS. 3C and 3D show a connector-less seismic data acquisition unit and a slot of a data retrieval unit to receive the data acquisition unit in accordance with principles disclosed herein.

FIG. 3C shows a connector-less seismic data acquisition unit 102 and a slot of a data retrieval unit 104 to receive the data acquisition unit in accordance with principles disclosed herein. The seismic data acquisition unit 102 includes a housing 352 having a top 342, a bottom 348 opposite the top 342, a first side 336, and a second side 340 opposite the first side 336. A spike 350 may project from the bottom 348 to provide improved ground coupling for acquisition of seismic signals. Sides 336 and 340 extend from the bottom 348 to the top 342. Each of the sides 336 and 340 intersect the top 342 to form an acute interior angle α. As the top 342 and the bottom 348 are parallel to one another, and the sides 336 and 340 are of equal length, the illustrated profile of the data acquisition unit 102 of FIG. 3C is generally that of an isosceles trapezoid. The angle α may be, for example, 60°.

In the data acquisition unit 102, the plates 214 are disposed on, along, adjacent, or near to the interior surface of the side 336 and the coil 202 is disposed on, along, adjacent, or near to the interior surface of the side 340. By disposing the coil 202 and the plates 214 on opposing sides 336, 340 of the data acquisition unit 102, crosstalk signals between the coil 202 and the plates 214 may be reduced.

The data retrieval unit 104 includes side modules 330 and 332. The side modules 330 and 332 may be coupled to a back plate (not shown). The side modules 330 and 332 are disposed at an angle that corresponds to the angles of the sides 336 and 340 of the data acquisition unit 102. The side module 330 includes plates 216 disposed on, along, adjacent, or near to the interior surface of the side module 330. The side module 332 includes coil 224 disposed on, along, adjacent or near to the interior surface of the side module 332. The sides modules 330 and 332 are spaced such that placing the data acquisition unit 102 in the data retrieval unit (i.e., between the side modules 330 and 332) causes the plates 214 to align (e.g., align along at least two axes) with the plates 216 and the coil 202 to align with the coil 224. The force of gravity on the data acquisition unit 102 holds the sides 336, 340 of the data acquisition unit 102 in close contact with side modules 330, 332 to minimize the distance between the plates 214 and 216 and between the coils 202 and 224, and to thereby optimize signal transfer between the plates 214 and 216 and between the coils 202 and 224.

Figure 3D:
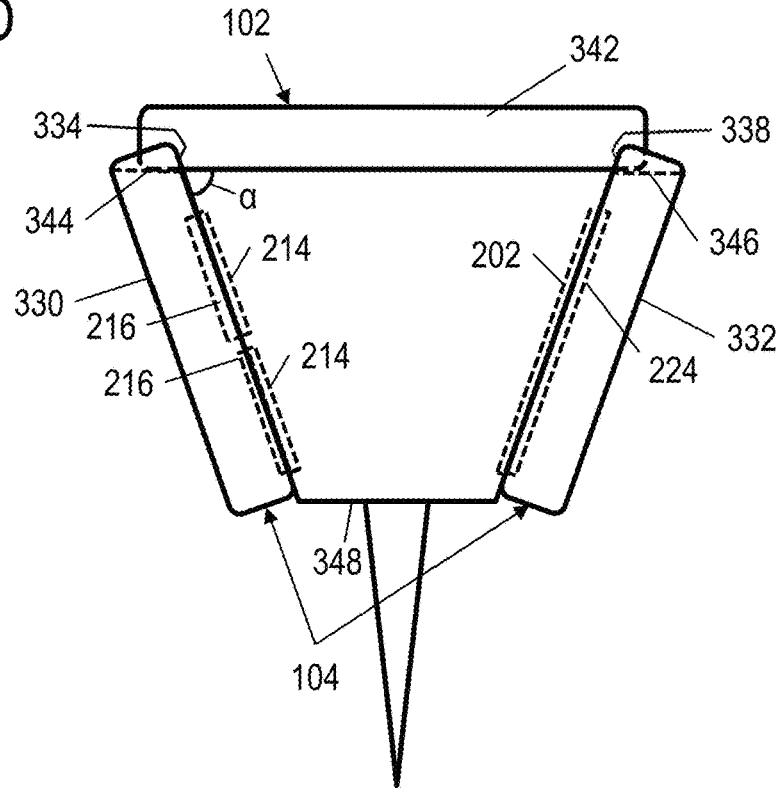

FIG. 3D shows the data acquisition unit 102 of FIG. 3C positioned in the data retrieval unit 104 for communication via the plates 214, 216 and coils 202, 224. In some embodiments, the top 342 of the data acquisition unit 102 rests on surface 344 of side module 330 and surface 346 of side module 332 of the data retrieval unit 104. The side modules 330 and 322 include tabs 334 and 338 respectively that extend above the surfaces 344, 346 as a guide and retention mechanism to align the data acquisition unit 102 in the data retrieval unit 104, and thereby align the plates 214 with the plates 216 and align the coil 202 with the coil 224. Thus, in the slot of the data retrieval unit 104 shown in FIGS. 3C and 3D, the angled side modules 330, 332, the tabs 334, 338, and the surfaces 344, 346 serve as alignment structures to align the plates 214 and 216, and the coils 202 and 224.

Figure 3E:
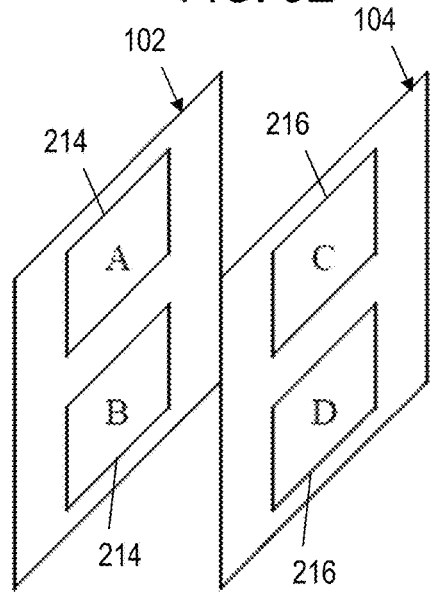
FIGS. 3E-3H show capacitor plate configurations suitable for use in a connector-less seismic data acquisition unit and a slot of a data retrieval unit in accordance with principles disclosed herein.
Figure 3F:
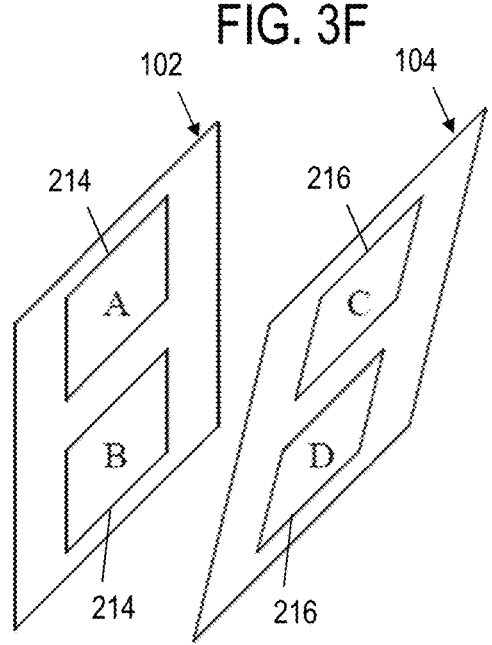

FIGS. 3E-3H show capacitor plate configurations suitable for use in a connector-less seismic data acquisition unit 102 and a slot of a data retrieval unit 104 in accordance with principles disclosed herein. Embodiments of the seismic data acquisition unit 102 and the data retrieval unit 104 may include various numbers and configurations of the plates 214, 216 to provide the capacitive interfaces through which seismic and other data is transferred between the seismic data acquisition unit 102 and the data retrieval unit 104. For example, FIG. 2 shows transfer from driver 208 of the data acquisition unit 102 to receiver 220 of the data retrieval unit 104 using two plates 214 and two plates 216 to form two capacitive interfaces. The signals transferred via these two capacitive interfaces may be differential signals, such that a positive polarity signal is transferred via one set of plates 214, 216, and a corresponding negative polarity signal is transferred via the other set of plates 214, 216. Such an arrangement is shown in FIGS. 3E and 3F. While FIGS. 3E-3H are generally described with respect to transfer of signals from the data acquisition unit 102 to the data retrieval unit 104, those skilled in the art will understand the description is equally applicable to arrangement of plates 214, 216 for transfer of signals from the data retrieval unit 104 to the data acquisition unit 102.

When transferring signals via the capacitive interfaces formed by the plates 214, 216, the common mode rejection (CMR) applied at the receiver 220 is a function of the distance between the plates 214 and 216 for each polarity of the differential signal. If the distance between the plates 214, 216 transferring the positive polarity signal is the same as the distance between the plates 214, 216 transferring the negative polarity signal, then the capacitance across the two pairs of plates 214, 216 is balanced and common mode signals present between the data acquisition unit 102 and the data retrieval unit 104 will be rejected by a differential amplifier in the receiver 220. FIG. 3E shows two capacitive interfaces for transfer of a differential signal. Plates 214 A and 216 C form a first interface (e.g., for positive polarity signal), and 214 B and 216 D form a second interface (e.g., for negative polarity signal). Because the distance between plates 214 A and 216 C is the same as the distance between plates 214B and 216D, capacitance across the two pairs of plates 214, 216 is balanced and common mode signals injected between the data acquisition unit 102 and the data retrieval unit 104 will be rejected by a differential amplifier in the receiver 220.

On the other hand, if the distance between the plates 214, 216 transferring the positive polarity signal is not the same as the distance between the plates 214, 216 transferring the negative polarity signal, then the common mode signals are converted to difference mode signals at the input of the receiver and cannot be distinguished from information signals, which may result in data errors. FIG. 3F shows two capacitive interfaces presented in FIG. 3E. Because the distance between plates 214 A and 216 C is not the same as the distance between plates 214B and 216D, capacitance across the two pairs of plates 214, 216 is not balanced and some portion of the common mode signals injected between the data acquisition unit 102 and the data retrieval unit 104 will be received as differential signals by a differential amplifier in the receiver 220. Unequal spacing between the plates 214, 216 may be caused by the wall of the data retrieval unit 104 that supports the plates 216 not being exactly parallel to the wall of the data acquisition unit 102 supporting the plates 214 due to misalignment or contamination (e.g., dirt) trapped in the gap between the walls.

Figure 3G:
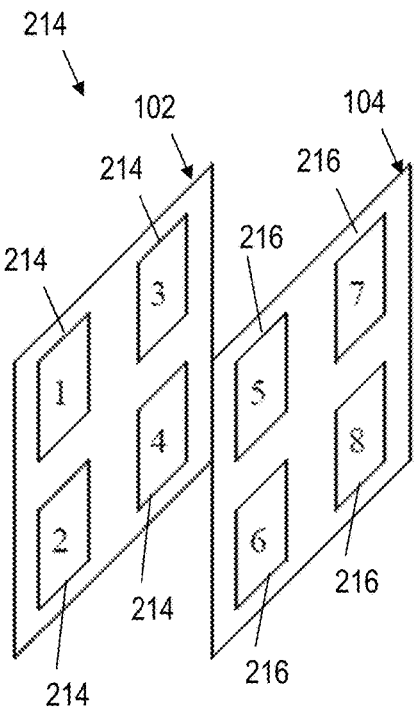

To alleviate common mode problems caused by variance in distance between the plates 214, 216 corresponding to a differential capacitive interface, some embodiments of the data acquisition unit 102 and the data retrieval unit 104 include four pairs of plates 214, 216 (i.e., four capacitive interfaces) for each differential capacitive interface. FIG. 3G shows four capacitive interfaces for transfer of a differential signal. Plates 214 1 and 216 5 form a first interface (e.g., for positive polarity signal), plates 214 4 and 216 8 form a second interface (e.g., for positive polarity signal), plates 214 3 and 216 7 form a third interface (e.g., for negative polarity signal), and plates 214 2 and 216 6 form a fourth interface (e.g., for negative polarity signal). Because the distance between all plate pairs 214 and 216 is the same, the capacitance across the pairs of plates 214, 216 is balanced and common mode signals injected between the data acquisition unit 102 and the data retrieval unit 104 will be rejected by a differential amplifier in the receiver 220.

Figure 3H:
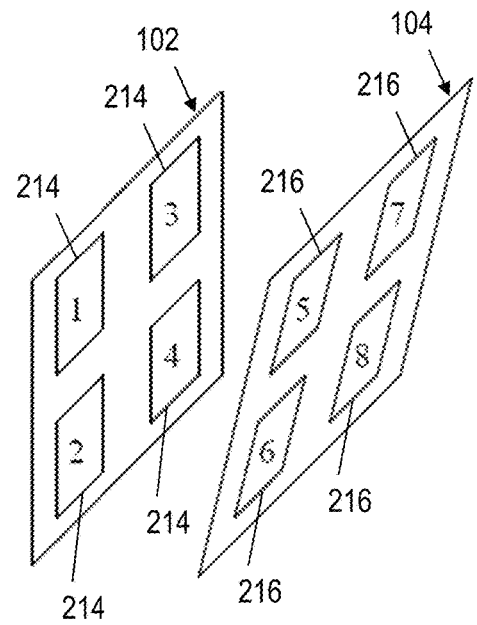

FIG. 3H shows the four capacitive interfaces for transfer of a differential signal illustrated in FIG. 3G but with a varying distance between the plates 214, 216. While variance in plate distance results in unbalanced capacitance when employing two capacitive interfaces as in FIGS. 3E and 3F, embodiments that include four capacitive interfaces provide improved CMR by disposing the plates 214, 216 to equalize the capacitance applied to transfer the two polarities of the differential signal. In the embodiment shown in FIGS. 3G and 3H, plates associated with a same polarity of the differential signal are both horizontally and vertically offset from one another. In FIG. 3H, the capacitance of the interfaces formed by plates 214 1, 216 5 and 214 4, 216 8 is equal to the capacitance of the interfaces formed by plates 214 3, 216 7 and 214 2, 216 6. Accordingly, the capacitance across the pairs of plates 214, 216 associated with the two polarities of the differential signal is balanced and common mode signals injected between the data acquisition unit 102 and the data retrieval unit 104 will be rejected by a differential amplifier in the receiver 220. Thus, some embodiments of the data acquisition unit 102 and the data retrieval unit 104 may employ the four plate configuration of FIGS. 3G and 3H, including non-parallel alignment and symmetry around the center of the four plates in the horizontal and vertical directions, to provide improved CMR.

Figure 4:
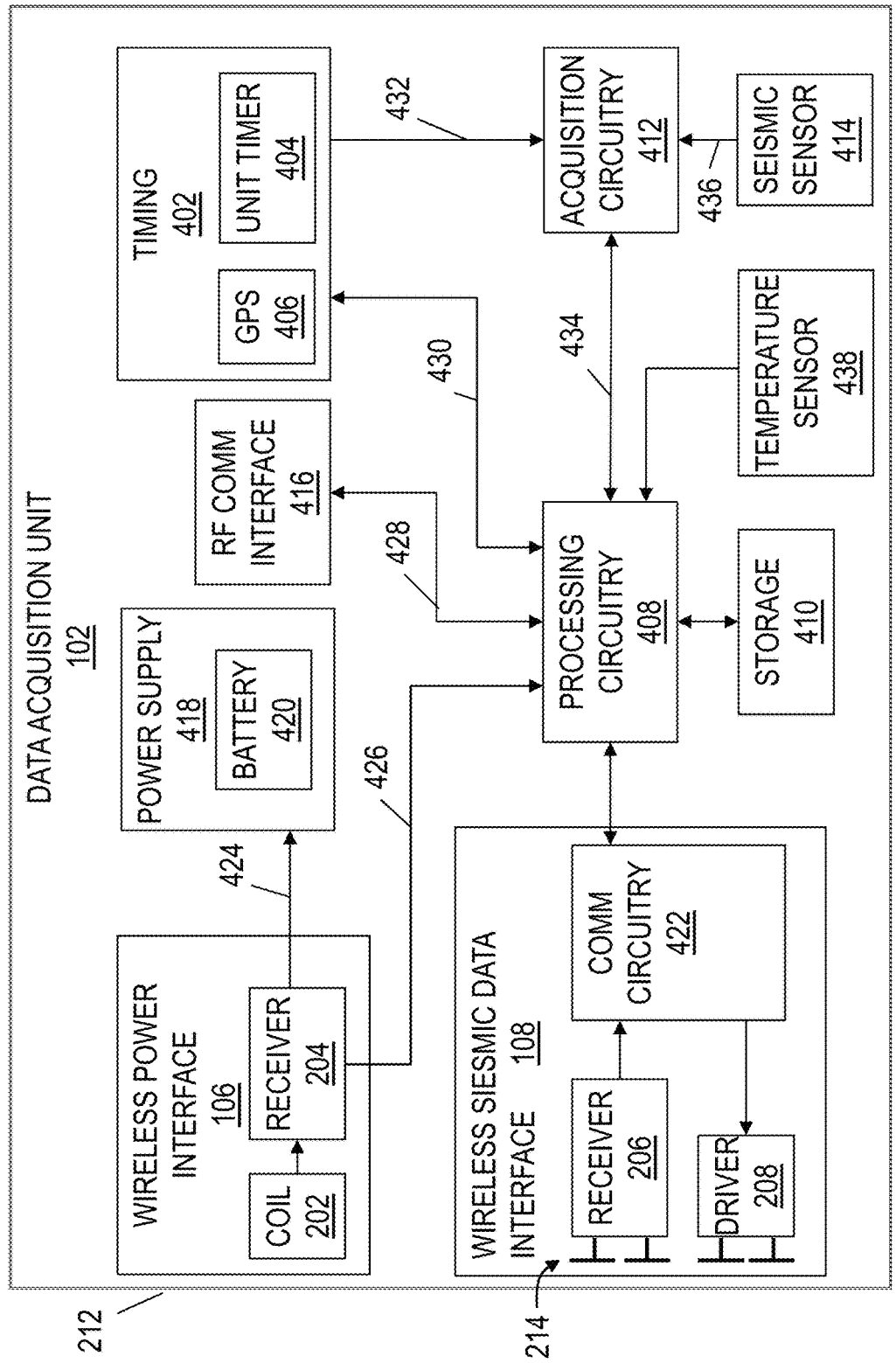
FIG. 4 shows a block diagram for a connector-less seismic data acquisition unit in accordance with principles disclosed herein.

FIG. 4 shows a block diagram for a connector-less seismic data acquisition unit 102 in accordance with principles disclosed herein. The data acquisition unit 102 includes the wireless power interface 106, the wireless seismic data interface 108, a power supply 418, an RF communication interface 416, timing circuitry 402, acquisition circuitry 412, a seismic sensor 414, processing circuitry 408, and storage 410. The power supply 418 includes a battery 420. The battery 420 may be a lithium-ion battery, a nickel metal hydride battery, a lead acid battery, or other type of battery. The power supply 418 is coupled to the wireless power interface 106. The wireless power interface 106 provides a charging current 424 to the power supply 418 to charge the battery 420. The receiver 204 generates the charging current 424 from the wireless power transmissions received from the data retrieval unit 104. The power supply 418 may also include one or more switching and/or linear voltage regulators coupled to the battery 420 to provide the voltages that power the circuitry of the data acquisition unit 102.

The wireless power interface 106 is also coupled to the processing circuitry 408. The processing circuitry 408 and the storage 410 may correspond to the storage and processing circuitry 210 of FIG. 2. The processing circuitry 408 may include a processor, such as a general-purpose microprocessor, a microcontroller, a digital signal processor, etc. The storage 410 may include volatile and/or non-volatile semiconductor memory for storage of seismic data, executable software instructions, sample timing information, and other data and parameters used by the data acquisition unit 102. The wireless power interface 106 extracts location information from the power signals transmitted by the data retrieval unit 104, and provides the location information to the processing circuitry 408. The processing circuitry 408 may provide the location information to the wireless seismic data interface 108 for transmission to the data retrieval unit 104 via the capacitive interface formed by the plates 214 and the housing 212. The location information may specify the slot 304 of the data retrieval unit 104 in which the data acquisition unit 102 is located.

The wireless seismic data interface 108 includes the receiver 206, the driver 208, and the plates 214 as described with respect to FIG. 2. The wireless seismic data interface also includes communication circuitry 422. The communication circuitry 422 may include encoding circuitry, modulation circuitry, etc. to prepare data for transmission via the driver 208. Similarly, the communication circuitry 422 may including decoding circuitry, demodulation circuitry, etc. to process the data received by the receiver 206. In some embodiments, the communication circuitry 422 may process data for transmission and data received in accordance with an IEEE 802.3 standard.

The RF communication interface 416 is coupled to the processing circuitry 408. The RF communication interface 416 may include an antenna and an RF transceiver via which the processing circuitry 408 can receive commands and/or parameters transmitted by an external controller, and/or transmit status or other information to the external controller. At least some embodiments of the data acquisition unit 102 may omit the RF communication interface 416. For example, commands and parameters may be provided to the data acquisition unit via the wireless seismic data interface 108.

The seismic sensor 414 is coupled to the acquisition circuitry 412. The seismic sensor 414 may include a geophone, an accelerometer (e.g., a microelectromechanical system (MEMS) accelerometer), a pressure transducer (e.g., a hydrophone), or combinations or multiples thereof to detect seismic signals. The seismic sensor 414 converts detected seismic signals to electrical signals 436 and provides the electrical signals to the acquisition circuitry 412. The acquisition circuitry 412 may include one or more amplifiers, filters, analog-to-digital converters and other circuitry to digitize the seismic signals detected by the seismic sensor 414. Digitization of the seismic signals produces sample values that are transferred to the processing circuitry 408 for recording in the storage 410. The processing circuitry 408 may also provide control parameters to the acquisition circuity 412 to control data acquisition. Such control parameters may include amplifier gains, filter corner frequencies, and/or other data acquisition parameters.

The acquisition circuitry 412 is coupled to the timing circuitry 402. The timing circuitry 402 provides timing signals 432 to the acquisition circuitry 412. The timing signals 432 control the timing, e.g., the timing of sampling, of the digitization of the seismic signals detected by the seismic sensor 414. The timing circuitry 402 is also coupled to the processing circuitry 408 via signals 430. The timing circuitry 402 may provide timing information to the processing circuitry 408 and/or receive parameters and/or control from the processing circuitry 408. The timing circuitry 402 includes a global positioning system (GPS) receiver 406 and a unit timer 404. The GPS receiver 406 receives satellite transmitted timing signals and provides a timing reference that can be used to synchronize generation of seismic data samples. For example, the GPS receiver may generate a time value and/or timing reference signal (e.g., pulse per second) based on signals received from a satellite. The GPS receiver 406 consumes a relatively large amount of power. For example, when powered the GPS receiver 406 may consume more power than all other components of the data acquisition unit 102 combined. To extend the time between rechargings of the battery 420 (i.e., the time that the data acquisition unit 102 can be deployed and acquiring seismic data after charging the battery 420) the processing circuitry 408 may minimize the time that the GPS receiver 406 is powered. Some embodiments of the data acquisition unit 102 may include an alternative type of satellite receiver (e.g., GLONASS, Galileo, etc.) or a terrestrial timing signal receiver to produce a reference time. A satellite receiver or terrestrial signal receiver that provides a reference time value or signal may be generally referred to as a reference time receiver. A time value provided by a reference time receiver may be referred to as a reference time value, and a transmitter that transmits the signals received by the reference time receiver may be referred to as a reference time source. The unit timer 404 may include timers and/or clock circuitry to generate the timing signals 432 that control generation of seismic data samples.

Figure 5:
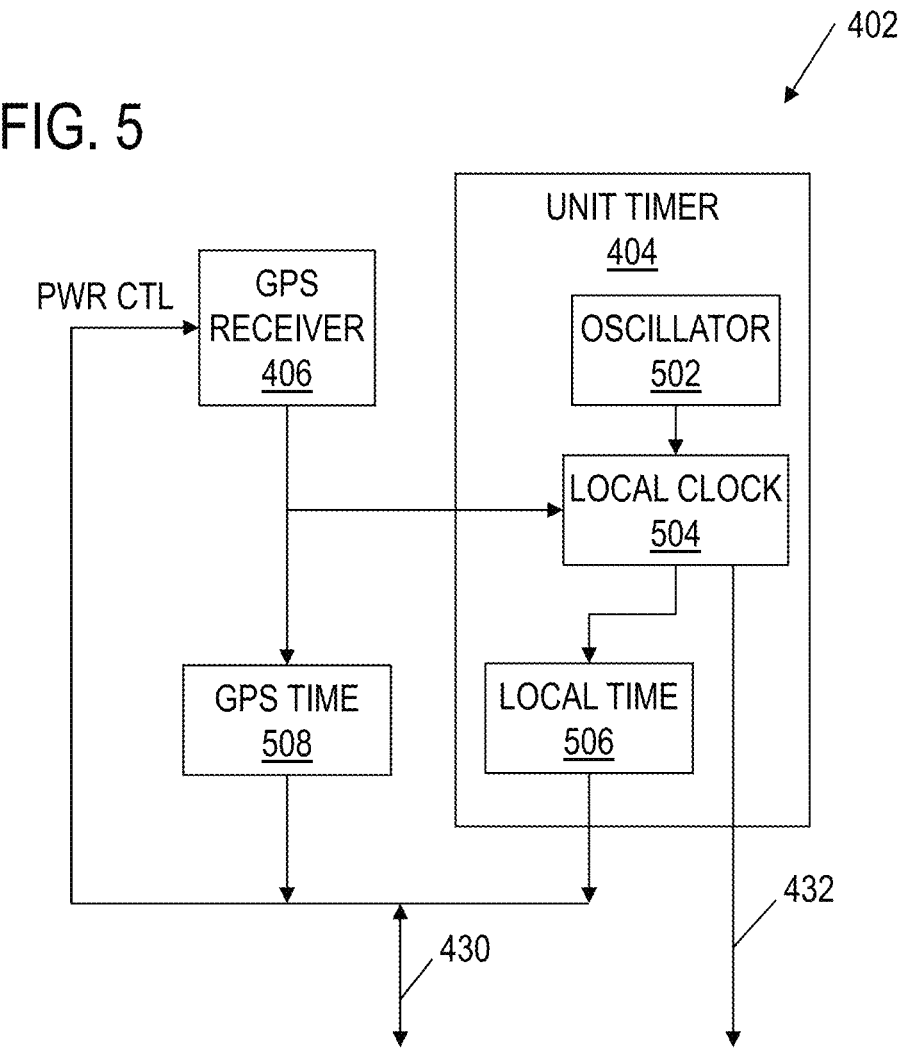
FIG. 5 shows a block diagram for a timing unit using a free-running clock in a seismic data acquisition unit in accordance with principles disclosed herein.

FIG. 5 shows a block diagram for an embodiment of the timing circuitry 402 that uses a free-running clock to control the timing of sample generation in the data acquisition unit 102. The timing circuitry 402 includes the GPS receiver 406 and an embodiment of the unit timer 404. The signals 430 exchanged with the processing circuitry 408 include a power control signal (PWR CTL) generated by the processing circuitry 408 that controls powering of the GPS receiver 406. The processing circuitry 408 enables powering of the GPS receiver 406 periodically (from time to time and not necessarily at a regular interval) and for only the time needed for the GPS receiver 406 to produce a time value based on the signals received from a satellite. Thus, embodiments minimize the time that the GPS receiver 406 is powered to increase the deployment time of the data acquisition unit 102.

The unit timer 404 includes an oscillator 502 and a local clock 504. The oscillator 502 is free running, and may be a crystal oscillator, a temperature compensated crystal oscillator, or other oscillator circuit. In some embodiments, the oscillator 502 may generally be of relatively low accuracy (e.g., 100 parts per million (ppm), 10 ppm, etc.), but may advantageously consume much lower power and/or be procured at much lower cost than more accurate oscillators, such as atomic or rubidium oscillators. In other embodiments, to reduce the need for frequent powerings of the GPS receiver 406, the oscillator 502 may provide higher frequency accuracy and/or frequency stability with higher power consumption, and at higher cost than less accurate oscillators. The oscillator 502 generates a clock signal (e.g., a fixed frequency clock signal) to increment the local clock 504. The local clock 504 may include timers that generate timing signals 432 based on the clock signal to control the timing of seismic sample generation in the acquisition circuitry 412, and may include a settable counter that is incremented by the clock signal as part of the timers. The local clock 504 is synchronized to a time value generated by the GPS receiver 406 at an initial time, but is generally free running as clocked by the oscillator 502. That is, at an initial time, prior to acquisition of seismic data by the data acquisition unit 102, the GPS receiver 406 is powered and generates an initial time value based on received satellite signals. The local clock 504 is set to the initial time value, and thereafter may be free running for the time period that the data acquisition unit 102 is deployed to acquire seismic data. Thus, while the local clock is initially synchronized to the GPS receiver 406, because the clock generated by the oscillator 502 differs in frequency from the highly accurate clock in the GPS satellites, after initialization the time value of the local clock 504 drifts from the time produced by the GPS receiver 406. For example, after initialization, the time value generated by the local clock 504 may drift from the time value generated by the GPS receiver 406 over the entire or a portion of the deployment of the data acquisition unit 102 (e.g., hours, days, or weeks).

After the local clock 504 is initialized to the initial time value generated by the GPS receiver 406, the processing circuitry 408 will power off the GPS receiver 406 to conserve energy of the battery 420. Over the duration of deployment of the data acquisition unit 102, the processing circuitry 408 may periodically power the GPS receiver 406 to obtain a reference GPS time value 508. The processing circuitry 408 may power the GPS receiver 406 for only as long as is needed to produce the reference GPS time value 508 (e.g., 3-4 seconds). In some embodiments, the reference GPS time value may be provided by timing signal, such as a pulse-per-second signal. Simultaneously with capture of the GPS time value 508, a local time value 506 (i.e., the time value of the free running local clock 504) is captured. In some embodiments, capture of the GPS time value 508, capture of the local time value 506, and/or sample generation may be synchronized, so that, for example, the captured GPS and local time values 508, 506 correspond to the generation time of a seismic data sample. The captured GPS time value 508 and the corresponding captured local time value 506 are transferred to the processing circuitry 408 and recorded in the storage 410 as a timing record. The timing record may also identify the particular seismic data sample generated at the time the GPS time value 508 and the local time value 506 were captured.

When the data acquisition unit 102 is coupled to the data retrieval unit 104, the data acquisition unit 102 transfers the timing records to the data retrieval unit 104 in conjunction with the acquired seismic data. The data retrieval unit 104 can store the timing records and seismic data for later processing. Some embodiments of the data retrieval unit 104 can apply the timing records to evaluate the drift of the time values generated by the local clock 504 from the time values generated by the GPS receiver 406, and to resample the seismic data downloaded from the data acquisition unit 102 to generate seismic data samples at sample times corresponding to the GPS time values. That is, the data retrieval unit 104 may apply the timing records to resample the acquired seismic data at times that samples would have been produced by the data acquisition unit 102 if the data acquisition unit 102 had sampled the seismic data in synchronization with continuously generated GPS time values. The resampling ensures that the seismic data samples of any number of data acquisition units 102 are aligned in time. Thus, the data acquisition unit 102 provides increased deployment time by reducing the time that the GPS receiver 406 is powered and by utilizing an oscillator 502 that consumes less power than more accurate oscillators, such as ovenized or rubidium oscillators.

FIG. 6 shows a block diagram for an embodiment of the timing circuitry 402 that uses a drift adjusted clock in the seismic data acquisition unit 102 in accordance with principles disclosed herein. The timing circuitry 402 includes the GPS receiver 406 and an embodiment of the unit timer 404. The signals 430 exchanged with the processing circuitry 408 include a power control signal (PWR CTL) generated by the processing circuitry 408 that controls powering of the GPS receiver 406. The processing circuitry 408 enables powering of the GPS receiver 406 periodically and for only the time needed for the GPS receiver 406 to produce a time value based on the signals received from a satellite.

The unit timer 404 includes a voltage controlled oscillator (VCO) 602, a local clock 504, and drift adjustment circuitry 604. The VCO 602 may include a crystal oscillator that allows for voltage controlled adjustment of output frequency, i.e., a voltage control crystal oscillator (VCXO). The VCO 602 generates a clock signal to increment the local clock 504. The local clock 504 may include timers that generate timing signals 432 based on the clock signal to control the timing of seismic sample generation in the acquisition circuitry 412, and may include a settable counter that is incremented by the clock signal as part of the timers. The local clock 504 is synchronized to a time value generated by the GPS receiver 406 at an initial time, but is generally free running as incremented by the clock signal generated by the VCO 602. That is, at an initial time, prior to acquisition of seismic data by the data acquisition unit 102, the GPS receiver 406 is powered and generates an initial time value based on received satellite signals. The local clock 504 is set to the initial time value, and thereafter may be free running for the time period that the data acquisition unit is deployed to acquire seismic data. Thus, while the local clock 504 is initially synchronized to the GPS receiver 406, after initialization the time value of the local clock 504 drifts from the time produced by the GPS receiver 406.

To compensate for drift of the time value generated by the local clock 504, the data acquisition unit 102 may periodically adjust the frequency of the clock signal generated by the VCO 602 (i.e., adjust the frequency of the clock signal generated by the VCO 602). The processing circuitry 408 periodically powers the GPS receiver 406 to allow the GPS receiver 406 to receive transmitted satellite signals and generates a GPS time value 508. After the GPS time value is captured, the processing circuitry 408 powers off the GPS receiver 406 to conserve the energy stored in the battery 420. The processing circuitry 408 may determine the period at which the GPS receiver 406 is powered to obtain a GPS time value 508 based on past measurements of drift, as a function of time, temperature, and/or other factors, of the local clock 504 from the GPS time value 508. Simultaneously with capture of the GPS time value 508, a local time value 506 is captured. The processing circuitry 408 may determine the drift of the local clock 504 from GPS time as the difference of the captured local time value 506 and the captured GPS time value 508. Given the determined drift, the processing circuitry 408 may control the drift adjust circuitry 604 to adjust the frequency of the VCO 602 such that the value of the local clock 504 will correspond to the time value produced by the GPS receiver 406 at the next capture of the GPS time value 508 and the local time value 506. The processing circuitry 408 may control the drift adjust circuitry 604 to change the frequency of the VCO 602 to make the GPS time value 508 and the local time value 506 correspond at the next scheduled capture and not before the next scheduled capture. The drift adjust circuitry 604 may change a control voltage provided to the VCO 602 to change the frequency of the VCO 602.

For example, if the period for capture and comparison of the local time value 506 and the GPS time value 508 is 100 seconds (s), and at a first capture the local time value 506 lags the GPS time value 506 by 100 microseconds (us), then the processing circuitry 408 may control the drift adjust circuitry 604 to increase the frequency of the VCO 602 as needed to compensate for the 100 us lag. Accordingly, the processing circuitry 408 may set the drift adjust circuitry 604 to increase the frequency of the VCO 602 by 0.0001% to compensate for the 100 us lag. Furthermore, the processing circuitry 408 may set the drift adjust circuitry 604 to increase the frequency of the VCO 602 by 0.0002% to make the local time value 506 equal to (or approximately equal to, given effects of operating conditions on the VCO 602) the GPS time value 508 when the local time value 506 and the GPS time value 508 are next captured (e.g., at the end of a next 100 s period). If at a second capture the local time value 506 is found to be approximately equal to the GPS time value 508, then the processing circuitry 408 may control the drift adjust circuitry 604 to maintain synchronization of the local time value 506 and the GPS time value 508. Because the frequency of the VCO 602 is changed by a relatively small amount to provide timing correction over a relatively long interval, the correction does not dramatically affect the timing of any particular seismic data sample.

Such control may include basing a next control of the drift adjustment circuitry 604 on a portion of the previously applied control that prevents additional accumulation of drift, but adds no compensation for previously accumulated drift. Thus, if in the example above, the processing circuitry 408 causes the drift adjust circuitry 604 to increase the VCO frequency by 0.0002% to compensate for the measured lag and additional lag expected over the next period, then at the end of the second measurement period, if the drift adjustment equalized the local time value 506 and the GPS time value 508, then the processing circuitry 408 may set the VCO frequency to be 0.0001% higher than the VCO frequency at the first capture (i.e., reduce the VCO frequency to 100.0001% of the VCO frequency at the first capture). Some embodiments of the drift adjust circuitry 604 may change the frequency of the VCO 602 by changing the control voltage of the VCO 602 via a digital-to-analog converter or other voltage source controllable by the processing circuitry 408. In some embodiments, the processing circuitry 408 may also adjust the frequency of the VCO 602 based on temperature, previous drift measurements, or other factors in addition to measured drift.

In some embodiments of the unit timer 404, the drift adjust circuitry 604 may correct for drift of the local clock 504 by manipulating the clocking of the local clock 504 rather than by adjusting the frequency produced by the VCO 602. For example given the example of local clock lag provided above, the processing circuitry 408 may determine a number of additional times that the local clock 504 should be incremented prior to the next capture of the local time value 506 to synchronize the local time value 506 and the GPS time value 508. The drift adjust circuitry 604 may cause the local clock 504 to be incremented the additional number of times (i.e., incremented the additional number of times in supplement to the number of time increments provided by the output of the VCO 602. Returning to the 100 us time lag of the example above, with a nominal 100 nanosecond clock period from the VCO 602, the drift adjust circuitry 602 may cause the local clock 504 to be incremented an additional 1000 times over the 100 s capture period to compensate for the 100 us lag. The drift adjust circuitry 604 may produce the additional increments by, for example, incrementing the local clock 504 on both rising and falling edges of the output of the VCO 602 once per 100 milliseconds. Other embodiments may apply a different method of producing more or fewer increments of the local clock to correct for drift. For example, software executed by the processing circuitry 408 may control the timing at which the local clock 504 is incremented.

FIG. 6A shows an example of operation of the timing unit 402 of FIG. 6 to produce a drift adjusted clock in the seismic data acquisition unit 102. Prior to the start of interval 610, the GPS receiver 406 is on and the local time value 506 is locked to GPS time 508. For example, the local clock 504 may be set to GPS time, and VCO 602 may be locked to GPS time 508 via a timing signal such as a 1 PPS produced by the GPS receiver 406. At the start of interval 610, the GPS receiver 406 is turned off to reduce power consumption and a time interval 610 during which the GPS receiver 406 is to not be powered is established. During interval 610, the phase of the clock signal produced by the VCO 602 drifts and the difference between the local time value 506 and GPS time 508 increases.

At the start of interval 612, the GPS receiver 406 is powered on and the local time value 506 is compared to GPS time value 508 to determine the time error that accumulated over interval 610 (i.e., to determine the phase error in VCO 602 output). Based on the measured time error, the processing circuitry 408 computes drift adjustment values, and a time interval during which the GPS receiver 406 is to not be powered. For example, if the accumulated time error is less than an error amount, then the time interval 612 may be longer than the time interval 610, and correspondingly, if the accumulated time error is greater than an error amount, then the time interval 612 may be shorter than the time interval 610. Two drift adjustment values are established based on the time error, a correction value, and a hold value. The correction value is to adjust the VCO 602 frequency to zero the error in the local time value over the interval 612. Thus, the correction value compensates for past and future time error. That is, the correction value compensates for timing error accumulated over the interval 610 and additional timing error that would be expected to accumulate over the interval 612. The hold value compensates for future timing error. That is, the hold value compensates for timing error that would be expected to accumulate over an interval, but does not compensate for previously accumulated timing error. With determination of the time of interval 612, and the correction and hold values, the correction value is applied to adjust the VCO 602 and the GPS receiver 406 is powered off at the start of the interval 612.

At the end of the interval 612 (correction interval), application of the correction value to the VCO 602 is discontinued, the hold value is applied to adjust to the VCO 602 over time interval 614 (hold interval), and the GPS receiver 406 is powered on. Application of the hold value to the VCO 602 is intended to prevent accumulation of additional time error while the GPS receiver 406 is powering on and acquiring the satellite signals needed to provide a GPS time value 508 (i.e., the time required for the GPS receiver 406 to produce a GPS time value 508 is generally time interval 614). The time required to acquire the satellite signals needed to provide a GPS time value 508 can vary substantially with atmospheric conditions, satellite availability, etc. Accordingly, the hold value may be applied to the VCO 602 for a widely variable time interval as needed to provide a GPS time value 508.

At the end of time interval 614, the local time value 506 is compared to GPS time value 508 to determine the time error that is present at the end of interval 614 (i.e., to determine the phase error in VCO 602 output). Based on the measured time error and the length of time interval 612, the processing circuitry 408 computes drift adjustment values (correction and hold values), and a time interval during which the GPS receiver 406 is to not be powered. With determination of the time of interval 616, and the correction and hold values, the correction value is applied to adjust the VCO 602 and the GPS receiver 406 is powered off at the start of the interval 616.

Operations associated with time intervals 616 and 620 are similar to those described above with respect to time interval 612, and operations associated with time intervals 618 and 622 are similar to those described above with respect to time interval 614. Thus, in a generally continuous process, newly computed correction values and hold values are alternately applied to the VCO 602 to respectively minimize timing error, and prevent accumulation of timing error during acquisition of a timing reference used to measure timing error. The operations described with respect to FIG. 6A, including determination of correction values, hold values, correction intervals, timing errors, etc. may be performed by circuitry of the timing unit 402 in conjunction with the processing circuitry 408. Throughout the operations described with respect to FIG. 6A, the temperature of the data acquisition unit 102 may be monitored by the processing circuitry 408 (e.g., via the temperature sensor 438). A detected change in temperature (e.g., a change of a predetermined magnitude over less that a predetermined time interval) may cause the processing circuitry 408 to power on the GPS receiver 406, measure a timing error value, and compute and apply a new correction value, hold value, and correction interval.

FIG. 7 shows a flow diagram for method 700 for data retrieval in a seismic data acquisition system 100 that includes connector-less data acquisition units 102 in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, can be implemented as instructions stored in a computer readable medium and executed by one or more processors.

In block 702, a data acquisition unit 102 has been deployed in the field and operated to acquire seismic data. Sometime after the data acquisition unit is deployed, the data acquisition unit 102 is transported to a data retrieval location and coupled to a data retrieval unit 104. For example, the data acquisition unit 102 may be positioned in a slot 304 of the data retrieval unit 104. In some embodiments, the data retrieval unit 104 may be brought to the location of data acquisition unit 102 deployment.

In block 704, the data retrieval unit 104 detects the data acquisition unit 102. For example, the data retrieval unit 104 may energize the coil 224 and monitor loading and/or communications to determine whether a data acquisition unit 102 is present in the slot 304. In some embodiments, the data acquisition unit 102 may modulate the load to notify the data retrieval unit 104 of the presence of the data acquisition unit 102. In some embodiments, the data retrieval unit 104 may include a switch that can be actuated by a user to notify the data retrieval unit 104 of the presence of a data acquisition unit 102 in the slot 304.

In block 706, the data retrieval unit 104 transmits power signals for powering and/or charging the data acquisition unit 102. The amount of power transmitted may be determined based on information provided by the data acquisition unit 102 via modulation of loading or other communication method. In some embodiments, the amount of power transmitted may be predetermined or limited by the data retrieval unit 104. In conjunction with transmission of power signals, the data retrieval unit 104 transmits location information, e.g., information identifying the slot 304 and the data retrieval unit 104. The location information may be encoded in the power signals.

In block 708, the data acquisition unit 102 detects the power signals and applies the detected power signals to charge the battery 420. For example, the data acquisition unit 102 rectifies the received power signals and regulates a voltage/current used to charge the battery 420. The data acquisition unit 102 also detects the location information signals, and decodes the location information signals to extract the location information from the transmitted signals. For example, the data acquisition unit 102 may identify changes in phase of the transmitted power signals to extract an encoded data stream from the power signals. In some embodiments, the data acquisition unit 102 powers off the wireless seismic data interface 108 until the data acquisition unit 102 detects the power signals from the data retrieval unit 104. In this way, the power consumed by the data acquisition unit 102 may be reduced and the time between rechargings of the battery 420 extended.

In blocks 710 and 712, the data retrieval unit 104 and the data acquisition unit 102 have established one another's presence and initiate communication via the capacitive interface formed by the plates 214, 216. Establishing communication via the plates 214, 216 may connect the data acquisition unit to a local area network. For example, the wireless seismic data interface 112 of slot 304 may be coupled to a network switch, a network router, a network access point, etc., that is coupled to the storage and processing circuitry 222 to form a local area network.

In block 714, the data acquisition unit 102 transmits identification and location information to the data retrieval unit 104. The identification and location information may be transmitted via the wireless seismic data interface 108. The identification information may include data that uniquely identifies the data acquisition unit 102 (e.g., a serial number). The location information may include the location information received from the data retrieval unit 104 via the wireless power interface 106.

In block 716, the data retrieval unit 104 receives the identification and location information transmitted by the data acquisition unit 102. The identification and location information may be received via the wireless seismic data interface 112. The location and identification information may be provided to a user to facilitate access to the data acquisition unit 102.

In block 718, the data acquisition unit 102 transmits, to the data retrieval unit 104, seismic data acquired while the data acquisition unit 102 was deployed. Transmission of the seismic data may include the processing circuitry 408 reading a number of samples of the seismic data from the storage 410 and inserting the samples in the payload of a packet. The processing circuitry 408 may transfer the packet to the wireless seismic data interface 108 for transmission to the data retrieval unit 104. Similarly, the data acquisition unit 102 may transmit timing data and/or geographical location information to the data retrieval unit 104. The geographical location information may include a geographical location at which the data acquisition unit 102 was deployed to collect seismic data. The timing data may include GPS time values 508 and local time values 506 periodically captured by the data acquisition unit 102. Each of the associated GPS time values 508 and/or local clock time values 506 may correspond to a particular sample of the seismic data transmitted by the data acquisition unit 102. For example, each of a GPS time value 508 and/or a local clock time value 506 may be provided as a time record that includes a sample number identifying the sample corresponding to the capture time of the GPS time value 508 and/or the local time value 506. Much like the transfer of the seismic data, transmission of timing data may include reading the timing data from the storage 410, inserting the timing data in the payload of a packet, and transferring the packet to the wireless seismic data interface 108 for transmission to the data retrieval unit 104.

In block 720, the data retrieval unit 104 receives the seismic data and timing data transmitted by the data acquisition unit 102. The data retrieval unit 104 may store the received seismic data and timing data in a mass storage device for future retrieval and processing.

In block 722, the data retrieval unit 104 applies the received seismic data and the received timing data to produce resampled seismic data having samples at sample times corresponding to GPS timing. For example, using the timing data received from the data acquisition unit 102, the data retrieval unit 104 may determine the GPS time at which each sample of seismic data received from the data acquisition unit 102 was acquired, and apply a resampling process (e.g., Lanczos resampling or another resampling method) to generate time corrected samples of the seismic data at desired GPS times.

Figure 8:
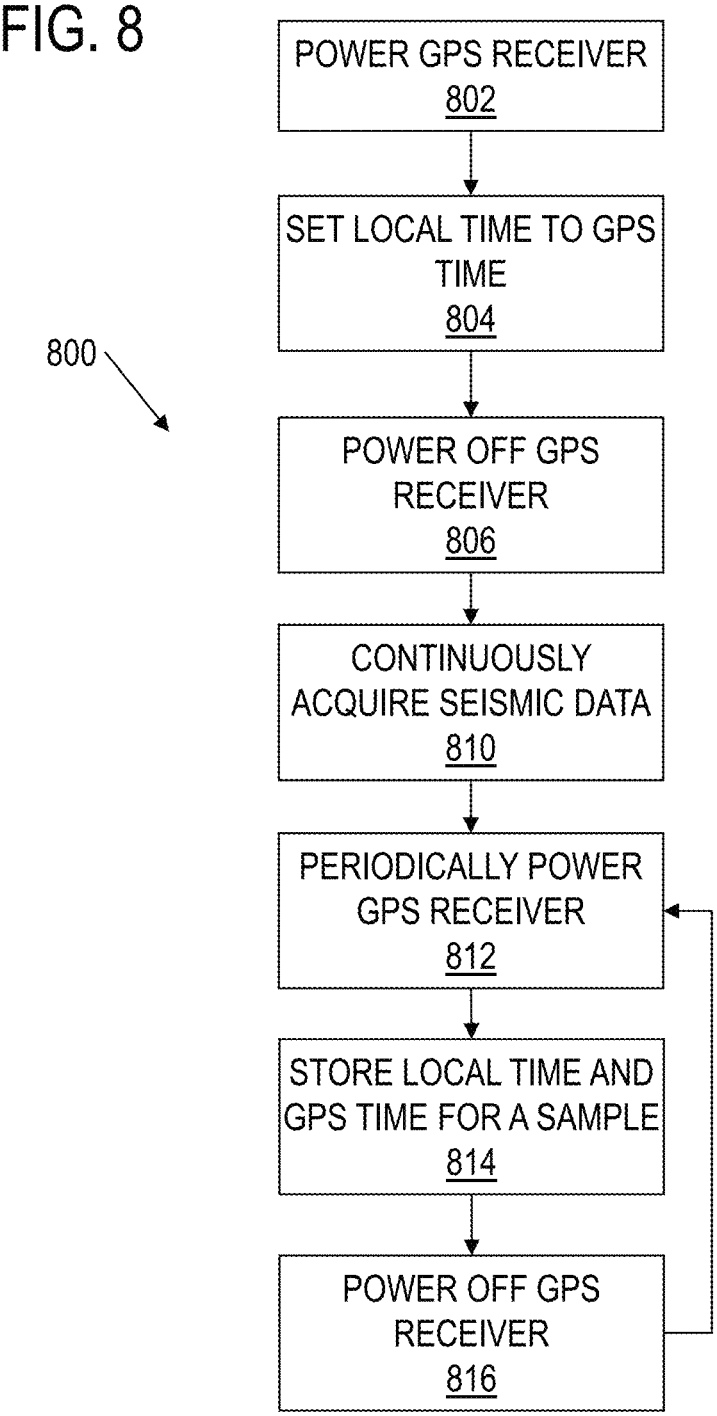
FIG. 8 shows a flow diagram for a method for acquiring seismic data using a free running clock in accordance with principles disclosed herein.

FIG. 8 shows a flow diagram for a method 800 for acquiring seismic data using a free running clock in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 800, as well as other operations described herein, can be implemented as instructions stored in a computer readable medium and executed by one or more processors.

In block 802, the data acquisition unit 102 is being prepared for use in acquisition of seismic data. The processing circuitry 408 powers the GPS receiver 406. The GPS receiver 406 receives signals transmitted by one or more satellites and generates a timing reference signal and a time value based on the received signals.

In block 804, the data acquisition unit 102 sets the time value of the local clock 504 to the time value generated by the GPS receiver 406. Accordingly, at the time the local clock 504 is set to the GPS time value, the local clock is synchronized with GPS time.

In block 806, the processing circuitry 408 powers off the GPS receiver 406 to conserve energy. In setting the local clock, the GPS receiver 406 may be powered for only a few seconds to minimize draw of power from the battery 420.

In block 810, the data acquisition unit 102 is acquiring seismic data. The acquisition of seismic data may be continuous after setting the local clock 504. In some embodiments, continuous acquisition of seismic data may be enabled at a predetermined time or at a particular time based on a command received from a central controller via the RF communication interface 416 or wireless seismic data interface 108. Acquired seismic data samples are stored for transfer to the data retrieval unit 104 (e.g., when the data acquisition unit 102 is transported to a staging area for recharging and data upload).

In blocks 812-816, while acquiring seismic data, the data acquisition unit 102 periodically acquires timing data for use in resampling. In block 812, the processing circuitry 408 powers the GPS receiver 406. The GPS receiver 406 receives signals transmitted by one or more satellites and generates a timing reference signal and a time value based on the received signals.

In block 814, the timing circuitry 402 captures a local time value 506 and a GPS time value 508. The local time value 506 and the GPS time value 508 may be captured at a time corresponding to a time of sample generation by the acquisition circuitry 412. The captured local time value 506 and GPS time value 508 are stored for transmission to the data retrieval unit 104 and use in resampling the seismic data acquired by the data acquisition unit 102.

In block 816, the processing circuitry 408 powers off the GPS receiver 406 to conserve energy. To capture the local time value 506 and the GPS time value 508 the GPS receiver 406 may be powered for only a few seconds (e.g., 3 s, 4 s, 10 s, 30 s) to minimize draw of power from the battery 420.

Figure 9:
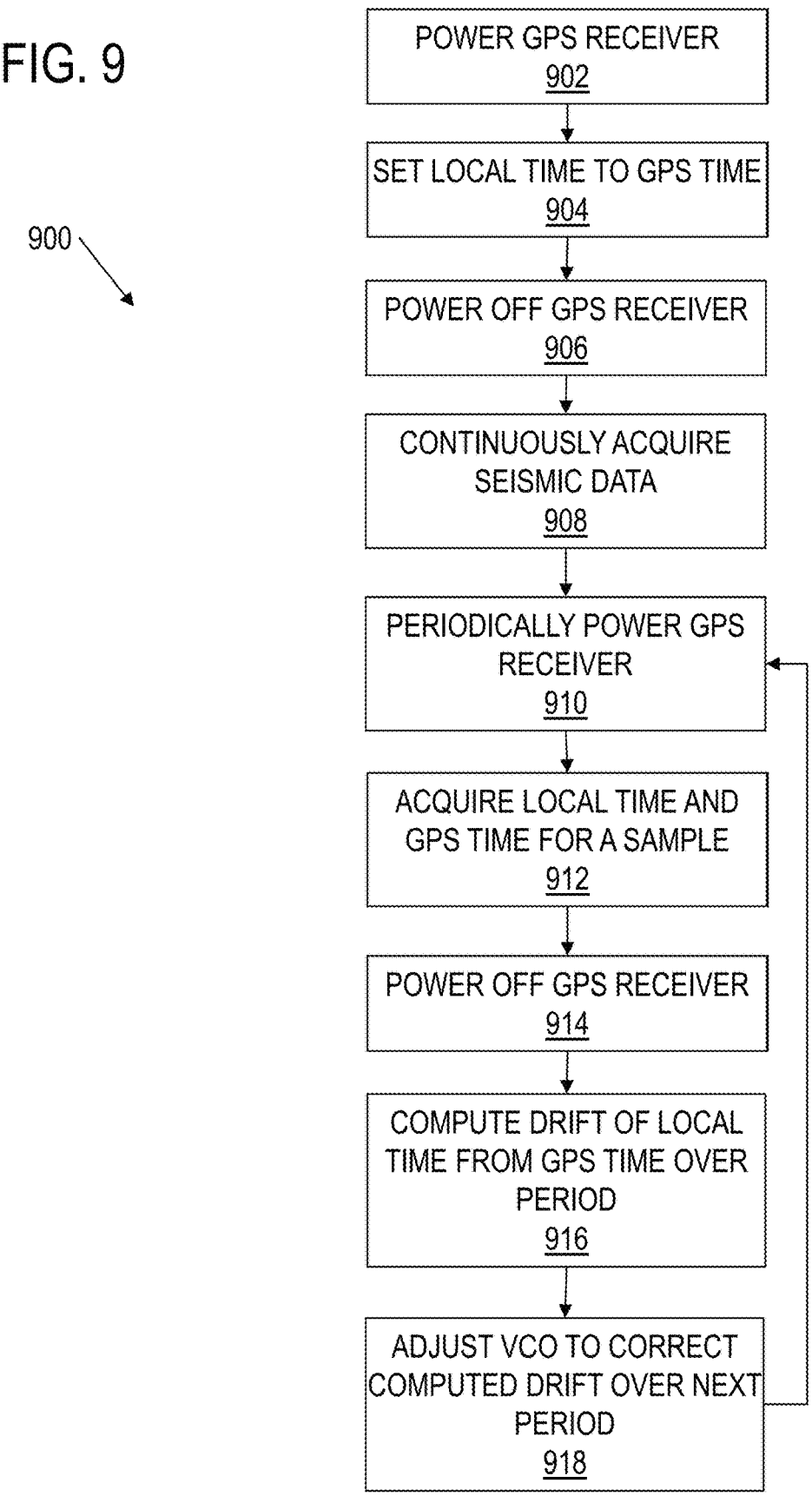
FIG. 9 shows a flow diagram for a method for acquiring seismic data using a drift adjusted clock in accordance with principles disclosed herein.

FIG. 9 shows a flow diagram for a method 900 for acquiring seismic data using a drift adjusted clock in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 900, as well as other operations described herein, can be implemented as instructions stored in a computer readable medium and executed by one or more processors.

In block 902, the data acquisition unit 102 is being prepared for use in acquisition of seismic data. The processing circuitry 408 powers the GPS receiver 406. The GPS receiver 406 receives signals transmitted by one or more satellites and generates a timing reference signal and a time value based on the received signals.

In block 904, the data acquisition unit 102 sets the time value of the local clock 504 to the time value generated by the GPS receiver 406. Accordingly, at the time the local clock 504 is set to the GPS time value, the local clock is synchronized with GPS time.

In block 906, the processing circuitry 408 powers off the GPS receiver 406 to conserve energy. To set the local clock, the GPS receiver 406 may be powered for only a few seconds (e.g., 3 s, 4 s, 10 s, 30 s) to minimize draw of power from the battery 420.

In block 908, the data acquisition unit 102 is acquiring seismic data. The acquisition of seismic data may be continuous after setting the local clock 504. In some embodiments, continuous acquisition of seismic data may be enabled at a predetermined time or at a particular time based on a command received from a central controller via the RF communication interface 416 or the wireless seismic data interface 108. Acquired seismic data samples are stored in the data acquisition unit 102 for transfer to the data retrieval unit 104 (e.g., when the data acquisition unit 102 is transported to a staging area for recharging and data upload).

In blocks 910-918, while acquiring seismic data, the data acquisition unit 102 periodically adjusts the timing that determines when seismic samples are generated. In block 910, the processing circuitry 408 powers the GPS receiver 406. The GPS receiver 406 receives signals transmitted by one or more satellites and generates a timing reference signal and a time value based on the received signals.

In block 912, the timing circuitry 402 captures a local time value 506 and a GPS time value 508.

In block 914, the processing circuitry 408 powers off the GPS receiver 406 to conserve energy. To capture the local time value 506 and the GPS time value 508 the GPS receiver 406 may be powered for only a few seconds to minimize draw of power from the battery 420.

In block 916, the processing circuitry 408 computes the amount of drift in the local clock from GPS time over the time duration from the previous capture to the latest capture of local and GPS time values. The processing circuitry 408 computes an adjustment to the VCO 602 to correct for the time drift of over a period of time extending to the next scheduled capture of local and GPS time values. That is, the processing circuitry 408 computes an adjustment to the VCO that slowly corrects for the drift over substantially the entire time period ending at the next scheduled capture of the local and GPS time values. The adjustment value may be based on control specifications for the VCO 602, wherein a predetermined change in the control voltage of the VCO 602 results in a predetermined change in output frequency of the VCO.

In block 918, the processing circuitry 408 provides control information to the drift adjust circuitry 604. For example, the processing circuitry 408 may provide a numeric value to the drift adjust circuitry 604, and the drift adjust circuitry 604 may convert the numeric value to a control voltage that drives the VCO 602 (i.e., change the output frequency of the VCO 602) to adjust for drift in the local clock 504.

The above discussion is meant to be illustrative of various principles and embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A system for seismic data acquisition, comprising:
   a data acquisition unit, comprising:
      a housing, and disposed within the housing:
         circuitry configured to detect and digitize seismic signals; and
         communication circuitry configured to communicate the digitized seismic signals to a data retrieval unit external to the data acquisition unit,
            the communication circuitry comprising:
               a first transmitter plate; and
               a first driver coupled to the first transmitter plate;
      power receiver circuitry comprising a first coil; and
   the data retrieval unit, comprising:
      a first receiver plate;
      a first receiver coupled to the first receiver plate;
      power transmitter circuitry comprising a second coil, and configured to:
         generate an oscillating magnetic field about the second coil;
         encode in the oscillating magnetic field a location value that uniquely identifies a physical location at which the data acquisition unit is coupled to the data retrieval unit; and
      an alignment structure configured to:
         receive the data acquisition unit; and
         align the first transmitter plate with the first receiver plate to form a capacitor, wherein the housing serves as a dielectric layer between the first transmitter plate and the first receiver plate;
         align the first coil and the second coil;
   wherein the power receiver circuitry is configured to:
      receive, via the first coil, an oscillating current induced in the first coil by the oscillating magnetic field;
      apply the oscillating current to charge an energy storage device that powers the data acquisition unit; and
      extract the location value from the oscillating current;
   wherein the communication circuitry is further configured to append the location value to data acquisition unit identification information to be transmitted to the data retrieval unit via the first transmitter plate.

2. The system of claim 1, wherein the data retrieval unit further comprises:
   a second receiver plate coupled to the first receiver;
   wherein the data retrieval unit is configured to receive the digitized seismic signals differentially via the first receiver plate and the second receiver plate; and
   wherein the communication circuitry further comprises:
      a second transmitter plate coupled to the first driver;
      wherein the communication circuit is configured to differentially drive the digitized seismic signals onto the first transmitter plate and the second transmitter plate.

3. The system of claim 1, wherein the data retrieval unit further comprises:
   a third transmitter plate; and
   a second driver coupled to the third transmitter plate;
   wherein the data retrieval unit is configured to transmit information to the data acquisition unit via the third transmitter plate; and
   wherein the communication circuitry further comprises:
      a third receiver plate; and
      a second receiver coupled to the third receiver plate;
      wherein the communication circuit is configured to receive the information via the third receiver plate.

4. The system of claim 3, wherein the data retrieval unit further comprises:
   a fourth transmitter plate coupled to the second driver; and
   wherein the data retrieval unit is configured to transmit information differentially to the data acquisition unit via the third transmitter plate and the fourth transmitter plate; and
   wherein the communication circuitry further comprises:
      a fourth receiver plate coupled to the second receiver; and
      wherein the communication circuit is configured to differentially receive the information via the third receiver plate and the fourth receiver plate.

5. The system of claim 1, wherein the data acquisition unit comprises timing circuitry configured to control a time of acquisition of each sample of a seismic signal, the timing circuitry comprising:
   an oscillator;
   a clock incremented by the oscillator to produce a local time value; and
   a reference time receiver;
   wherein the timing circuitry is configured to:
      periodically:
         power on the reference time receiver to generate a reference time value based on signals received from a reference time source;
         record the reference time value and the local time value; and
         power off the reference time receiver responsive to generation of the reference time value and the local time value.

6. The system of claim 5, wherein the timing circuitry is further configured to, at each periodic powering of the reference time receiver, power the reference time receiver for a time sufficient to generate and capture the reference time value.

7. The system of claim 5, wherein the data retrieval unit is configured to:
   receive the digitized seismic signals from the data acquisition unit;
   determine a reference time at which each sample of the digitized seismic signals was acquired based on the recorded reference time values and local time values; and
   resample the digitized seismic signals to produce seismic samples at times corresponding to sampling continuously synchronized to reference time.

8. The system of claim 1, wherein the data acquisition unit further comprises timing circuitry configured to control a time of acquisition of each sample a seismic signal, the timing circuitry comprising:
   a voltage controlled oscillator;
   a local clock incremented by the voltage controlled oscillator;
   a reference time receiver; and
   wherein the timing circuitry is configured to:
      periodically:
         power on the reference time receiver to generate a reference time value based on signals received from a reference time source;
         measure time deviation of the local clock from the reference time value; and
         adjust the voltage controlled oscillator to produce an output frequency selected to bring the local clock into synchronization with the reference time value produced at a time the reference time receiver is next powered.

9. The system of claim 8, wherein the timing circuitry is further configured to:
   set an interval to periodically power the reference time receiver based on the measured time deviation; and
   power the reference time receiver for a time sufficient to generate the reference time.

10. The system of claim 8, wherein the timing circuitry is further configured to:
    determine a correction value to apply to the voltage controlled oscillator to produce the output frequency selected to bring the local clock into synchronization with the reference time value; and
    determine a hold value to apply to the voltage controlled oscillator while powering on the reference time receiver to generate a reference time value.

11. A seismic data acquisition unit, comprising:
    a housing, and disposed within the housing:
       circuitry configured to detect and digitize seismic signals;
       power receiver circuitry comprising a coil, and configured to:
          receive, via the coil, an oscillating current induced in the coil by an oscillating magnetic field generated external to the housing;
          apply the oscillating current to charge an energy storage device that powers the seismic data acquisition unit; and
          extract, from the oscillating current, a location value that uniquely identifies a physical location of the seismic data acquisition unit; and
       communication circuitry comprising:
          a first transmitter plate adjacent a wall of the housing; and
          a driver coupled to the first transmitter plate;
          wherein the communication circuitry is configured to:
             communicate the digitized seismic signals to a data retrieval unit that is external to the data acquisition unit via a capacitor formed by the first transmitter plate, the wall of the housing, and a receiver plate external to the housing; and
             append the location value to seismic data acquisition unit identification information to be transmitted to the data retrieval unit via the first transmitter plate.

12. The seismic data acquisition unit of claim 11, wherein the communication circuitry further comprises:
    a second transmitter plate coupled to the driver;
    wherein the communication circuit is configured to differentially drive the digitized seismic signals onto the first transmitter plate and the second transmitter plate.

13. The seismic data acquisition unit of claim 11, wherein the communication circuitry further comprises:
    a first receiver plate; and
    a receiver coupled to the first receiver plate;

wherein the communication circuitry is configured to receive information transmitted by the data retrieval unit via the first receiver plate.

14. The seismic data acquisition unit of claim 13, wherein the communication circuitry further comprises:
a second receiver plate coupled to the receiver; and
wherein the communication circuit is configured to differentially receive information transmitted by the data retrieval unit via the first receiver plate and the second receiver plate.

15. The seismic data acquisition unit of claim 11, further comprising:
timing circuitry configured to control a time of acquisition of each sample of a seismic signal, the timing circuitry comprising:
an oscillator;
a clock incremented by the oscillator to produce a local time value; and
a reference time receiver;
wherein the timing circuitry is configured to: periodically:
power on the reference time receiver to generate a reference time value based on signals received from a reference time source;
record the reference time value and the local time value; and
power off the reference time receiver responsive to generation of the reference time value and the local time value.

16. The seismic data acquisition unit of claim 15, wherein the timing circuitry is further configured to, at each periodic powering of the reference time receiver, power the reference time receiver for a time sufficient to generate a reference time value.

17. The seismic data acquisition unit of claim 11, further comprising timing circuitry configured to control a time of acquisition of each sample a seismic signal, the timing circuitry comprising:
a voltage controlled oscillator;
a local clock incremented by the voltage controlled oscillator; and
a reference time receiver;
wherein the timing circuitry is configured to: periodically:
power on the reference time receiver to generate a reference time value based on signals received from a reference time source;
measure time deviation of the local clock from the reference time value; and
adjust the voltage controlled oscillator to produce an output frequency selected to bring the local clock into synchronization with the reference time value produced at a time the reference time receiver is next powered.

18. The seismic data acquisition unit of claim 17, wherein the timing circuitry is further configured to:
set an interval to periodically power the reference time receiver based on the measured time deviation; and power the reference time receiver for a time sufficient to generate the reference time.

19. The seismic data acquisition unit of claim 17, wherein the timing circuitry is further configured to:
determine a correction value to apply to the voltage controlled oscillator to produce the output frequency selected to bring the local clock into synchronization with the reference time value; and
determine a hold value to apply to the voltage controlled oscillator while powering on the reference time receiver to generate a reference time value.

20. A data retrieval unit, comprising:
a plurality of slots, each of the slots configured to receive a data acquisition device and retrieve digitized seismic signals from the data acquisition device;
wherein each of the slots comprises:
a first receiver plate;
a receiver coupled to the first receiver plate;
power transmitter circuitry comprising a power transmission coil, and configured to:
generate an oscillating magnetic field about the power transmission coil; and
encode in the oscillating magnetic field a location value that uniquely identifies a physical location of the slot; and
an alignment structure configured to:
align the first receiver plate and a first transmitter plate of the data acquisition device; wherein aligning the first receiver plate and the first transmitter plate forms a capacitor in which a housing of the data acquisition device serves as a dielectric layer between the first receiver plate and the first transmitter plate; and
align the power transmission coil with a power reception coil of the data acquisition device;
wherein the receiver is configured to receive, via the capacitor, the location value extracted from the oscillating magnetic field by the data acquisition device and the digitized seismic signals.

21. The data retrieval unit of claim 20, wherein each of the slots further comprises:
a second receiver plate coupled to the receiver;
wherein the receiver is configured to receive the digitized seismic signals differentially via the first receiver plate and the second receiver plate.

22. The data retrieval unit of claim 20, wherein each of the slots further comprises:
a first transmitter plate; and
a driver coupled to the first transmitter plate;
wherein the driver is configured to transmit information to the data acquisition unit via the first transmitter plate.

23. The data retrieval unit of claim 22, wherein each of the slots further comprises:
a second transmitter plate coupled to the driver; and
wherein the driver is configured to transmit information differentially to the data acquisition unit via the first transmitter plate and the second transmitter plate.

* * * * *